United States Patent
Thomas et al.

(10) Patent No.: US 11,157,300 B2
(45) Date of Patent: Oct. 26, 2021

(54) MANAGING VIRTUAL MACHINE SECURITY RESOURCES

(71) Applicant: Sophos Limited, Abingdon (GB)

(72) Inventors: Andrew J. Thomas, Oxfordshire (GB); Chloe Bell, Bicester (GB); Robert William Allsworth, Oxford (GB); Mark Andrew Gill, Witney (GB); Timothy Edward Cobley, Oxford (GB); Trevor Neil McGing, Abingdon (GB); Daphne Kyriaki Allamenou, Abingdon (GB); Andrew Colin Piper, Waterloo (CA)

(73) Assignee: Sophos Limited, Abingdon (GB)

( * ) Notice: Subject to any disclaimer, the term of this patent is extended or adjusted under 35 U.S.C. 154(b) by 192 days.

(21) Appl. No.: 16/023,376

(22) Filed: Jun. 29, 2018

(65) Prior Publication Data
US 2019/0250937 A1 Aug. 15, 2019

Related U.S. Application Data

(60) Provisional application No. 62/630,163, filed on Feb. 13, 2018.

(51) Int. Cl.
*G06F 9/455* (2018.01)
*G06F 9/50* (2006.01)
(Continued)

(52) U.S. Cl.
CPC .......... *G06F 9/45558* (2013.01); *G06F 9/505* (2013.01); *G06F 9/5077* (2013.01);
(Continued)

(58) Field of Classification Search
None
See application file for complete search history.

(56) References Cited

U.S. PATENT DOCUMENTS 8,479,294 B1 7/2013 Li et al.
9,009,836 B1 4/2015 Yarykin et al.
(Continued)

FOREIGN PATENT DOCUMENTS

EP 2933748 10/2015

OTHER PUBLICATIONS

USPTO, "U.S. Appl. No. 15/042,955 Non-Final Office Action dated Feb. 22, 2018", 17 pages.
(Continued)

*Primary Examiner* — Eric C Wai
(74) *Attorney, Agent, or Firm* — Strategic Patents, P.C.

(57) ABSTRACT

In a virtualized environment where multiple guest virtual machines receive security services from multiple security virtual machines, a guest virtual machine automatically transitions to a new virtual security machine under various conditions. For example, the guest virtual machine may select a new security virtual machine when connectivity to the current security virtual machine degrades below a predetermined threshold, or in response to a request from the current security virtual machine indicating, e.g., that the current security virtual machine is about to shut down or otherwise terminate security services to the guest virtual machine.

19 Claims, 17 Drawing Sheets

(51) Int. Cl.
  *H04L 12/24* (2006.01)
  *H04L 12/26* (2006.01)
  *G06F 21/56* (2013.01)
(52) U.S. Cl.
  CPC ............ *G06F 9/5083* (2013.01); *G06F 21/56* (2013.01); *H04L 41/0896* (2013.01); *H04L 43/0811* (2013.01); *G06F 2009/4557* (2013.01); *G06F 2009/45587* (2013.01); *G06F 2209/5011* (2013.01); *H04L 43/0852* (2013.01); *H04L 43/10* (2013.01)

(56) References Cited

U.S. PATENT DOCUMENTS

| | | | |
|---|---|---|---|
| 9,769,248 B1* | 9/2017 | Krishnan | H04L 41/5067 |
| 10,048,874 B1* | 8/2018 | Shveidel | G06F 3/0689 |
| 2013/0061012 A1 | 3/2013 | Turner et al. | |
| 2014/0181975 A1 | 6/2014 | Spernow et al. | |
| 2016/0269427 A1 | 9/2016 | Haugsnes | |
| 2017/0126479 A1* | 5/2017 | Vangheepuram | ... H04L 41/0654 |
| 2017/0192810 A1 | 7/2017 | Lukacs et al. | |
| 2017/0235951 A1 | 8/2017 | Harrison et al. | |
| 2019/0130106 A1 | 5/2019 | Harrison et al. | |

OTHER PUBLICATIONS

USPTO, "U.S. Appl. No. 15/042,955 Notice of Allowance dated Sep. 12, 2018", 15 pages.
IPO, "UK Application No. 1702143.7 Search Report dated Jul. 21, 2017", 3 pages.
USPTO, "U.S. Appl. No. 16/219,637 Non-Final Office Action dated Sep. 6, 2019", 13 pages.
ISA, "PCT Application No. PCT/GB2019/050381 International Search Report and Written Opinion dated Apr. 2, 2019", 13 pages.
USPTO, "U.S. Appl. No. 16/219,637 Notice of Allowance dated May 6, 2020", 16 pages.

* cited by examiner

MANAGING VIRTUAL MACHINE SECURITY RESOURCES

RELATED APPLICATIONS

This application claims the benefit of U.S. Prov. App. No. 62/630,163 filed on Feb. 13, 2018, the entire content of which is hereby incorporated by reference.

TECHNICAL FIELD

This application relates to management of security resources in a virtualized environment.

BACKGROUND

Various techniques are known for securing endpoints in an enterprise network against malicious software, such as the techniques described in commonly-owned U.S. patent application Ser. No. 14/263,955 filed on Apr. 28, 2014, U.S. Application Ser. No. 14/485,759 filed on Sep. 14, 2014, U.S. patent application Ser. No. 15/042,862 filed on Feb. 12, 2016, U.S. patent application Ser. No. 15/042,955 filed on Feb. 12, 2016, U.S. patent application Ser. No. 15/098,684 filed on Apr. 14, 2016, and U.S. patent application Ser. No. 15/429,291 filed on Feb. 10, 2017, each of which is hereby incorporated by reference in its entirety. Within a virtualized environment, security services such as scanning may be centralized in order to reduce the processing and memory footprints. For large virtualized environments including many virtual machines, these centralized security services may be distributed across multiple virtual security virtual machines and/or multiple physical devices. There remains a need for improved management of security services in a context where multiple virtual security machines provide security services to multiple virtual guest machines.

SUMMARY

In a virtualized environment where multiple guest virtual machines receive security services from multiple security virtual machines, a guest virtual machine automatically transitions to a new virtual security machine under various conditions. For example, the guest virtual machine may select a new security virtual machine when connectivity to the current security virtual machine degrades below a pre-determined threshold, or in response to a request from the current security virtual machine indicating, e.g., that the current security virtual machine is about to shut down or otherwise terminate security services to the guest virtual machine.

In an aspect, a system disclosed herein includes a plurality of guest virtual machines executing in a virtualized computing environment of one or more hypervisors configured to provide the virtualized computing environment for virtual machines and distributed over two or more physical computing devices coupled in a communicating relationship with one another through a physical data network, and a plurality of security virtual machines executing on one or more of the physical computing devices and providing security services to the plurality of guest virtual machines, where each one of the plurality of guest virtual machines is coupled to a current one of the plurality of security virtual machines and where one of the plurality of guest virtual machines is configured to respond to a change in connectivity with the current one of the security virtual machines by searching for another one of the plurality of security virtual machines to provide the security services to the guest virtual machine and selecting one of the plurality of security virtual machines for security services based on one or more selection criteria.

The one or more selection criteria may include a latency of data communications. The one or more selection criteria may include a bandwidth for data communications. The one or more selection criteria may include a quantity of the guest virtual machines currently receiving security services from each of the plurality of security virtual machines. Searching for another one of the plurality of security virtual machines may include querying each of the plurality of security virtual machines. Each of the security virtual machines may store information about other ones of the security virtual machines, where searching for another one of the plurality of security virtual machines includes querying one of the plurality of security virtual machines currently providing security services to the one of the guest virtual machines for information about other ones of the security virtual machines. Selecting one of the plurality of security virtual machines for security services may include randomly selecting one of the plurality of security virtual machines from among a group of the plurality of security virtual machines having a healthy state. The healthy state may be determined based on at least one of a software patch status, a software update status, an antivirus scan, and a connectivity to a threat management facility. Selecting one of the plurality of security virtual machines for security services may include randomly selecting one of the plurality of security virtual machines from among a group of the plurality of security virtual machines providing connectivity within a top percentile for latency. The top percentile may include a top third, a top quartile, or a top decile. Selecting one of the plurality of security virtual machines for security services may include randomly selecting one of the plurality of security virtual machines from among a group of the plurality of security virtual machines having a latency within a predetermine range of a lowest latency one of the security virtual machines. The security services may include file scanning. The security services may include network traffic monitoring. The change in connectivity may include a loss of connectivity to the current one of the security virtual machines. The change in connectivity may include a decrease in a quality of connectivity to the current one of the security virtual machines. The change in connectivity may include an improvement in a quality of connectivity to one or more other ones of the security virtual machines. The change in connectivity may include a notification from a management console for the virtualized computing environment that the current one of the security virtual machines will terminate security services. Each of the plurality of guest virtual machines may include a security agent locally executing on the one of the plurality of guest virtual machines to manage communications with the current one of the security virtual machines. At least one of the guest virtual machines may receive security services from one of the security virtual machines executing on a different one of the physical computing devices. The one of the plurality of guest virtual machines may establish a second connection to the one of the security virtual machines before terminating a first connection to the current one of the security virtual machines.

In an aspect, a computer program product comprising computer executable code embodied in a non-transitory computer readable medium disclosed herein, when executing on one or more computing devices, performs the steps of executing a security agent on a guest virtual machine in a virtualized computing environment, managing communications between the guest virtual machine and a first security virtual machine with the security agent, the first security virtual machine providing one or more security services to the guest virtual machine, measuring a latency of a connection between the first security virtual machine and the guest virtual machine, when the latency increases beyond a predetermined threshold, randomly selecting a second security virtual machine from among a group of security virtual machines within the virtualized computing environment having a healthy state and a communication latency above a predetermined threshold for all of the security virtual machines available in the virtualized computing environment, and transitioning use of the security services by the guest virtual machine from the first security virtual machine to the second security virtual machine.

The predetermined threshold may be a time for the communication latency within a predetermined range of a lowest latency one of the security virtual machines. The predetermined threshold may be determined based on the communication latency among a top percentile group of the security virtual machines available in the virtualized computing environment. The predetermined threshold may be determined based on an average communication latency among a top percentile group of the security virtual machines available in the virtualized computing environment.

In an aspect, a method disclosed herein includes executing a security agent on a guest virtual machine in a virtualized computing environment, managing communications between the guest virtual machine and a first security virtual machine, the first security virtual machine providing one or more security services to the guest virtual machine, detecting a condition affecting performance of the first security virtual machine in providing security services to the guest virtual machine, in response to the condition, selecting a second security virtual machine from among a number of other security virtual machines within the virtualized computing environment based on one or more connectivity criteria, transitioning use of the security services by the guest virtual machine from the first security virtual machine to the second security virtual machine.

The condition may include a network performance dropping below a predetermined threshold for latency. The condition may include a network performance dropping below a predetermined threshold for bandwidth. The condition may include a notification that the first security virtual machine will stop providing security services. The condition may include a notification that the guest virtual machine will migrate to a different physical machine. The one or more security services may include file scanning. The one or more security services may include at least one of malware definition updates for use by the security agent in detecting malware on the guest virtual machine and network monitoring. The one or more connectivity criteria may include a latency of communications with each of the number of other security virtual machines. The one or more connectivity criteria may include a bandwidth of communications with each of the number of other security virtual machines. The one or more connectivity criteria may include a guest machine load for each of the number of other security virtual machines. At least one of the other security virtual machines may be hosted on a first physical computing device separate from, and connected in a communicating relationship through a physical data network to, a second physical computing device hosting the guest virtual machine. The second security virtual machine may be hosted on a second physical computing device separate from, and connected in a communicating relationship through a physical data network to, a first physical computing device hosting the guest virtual machine. The second security virtual machine may be hosted on a second physical computing device separate from, and connected in a communicating relationship through a physical data network to, a first physical computing device hosting the first security virtual machine. The method may further include grouping the security virtual machines into at least two percentile groups based on latency, the at least two percentile groups including a lowest latency group. Selecting the second security virtual machine may include randomly selecting one of the security virtual machines in the lowest latency group.

In an aspect, a device disclosed herein includes a computing device including one or more processors, and a memory bearing computer code configured to execute on the one or more processors to create a virtual computing environment including one or more hypervisors configured to provide the virtual computing environment, a number of guest virtual machines executing in the virtual computing environment, and a number of security virtual machines executing in the virtual computing environment, the computer code further configured to provide security services to one of the guest virtual machines by performing the steps of executing a security agent on one of the guest virtual machines in the virtualized computing environment, managing communications between the one of the guest virtual machines and a first security virtual machine with the security agent, the first security virtual machine providing one or more security services to the one of the guest virtual machines, detecting a condition affecting performance of the first security virtual machine in providing security services to the one of the guest virtual machines, in response to the condition, selecting a second security virtual machine from the number of security virtual machines within the virtualized computing environment based on one or more connectivity criteria, and transitioning use of the security services by the one of the guest virtual machines from the first security virtual machine to the second security virtual machine.

In an aspect, a computer program product comprising computer executable code embodied in a non-transitory computer readable medium disclosed herein, when executing on one or more computing devices, performs the steps of establishing a first connection from a virtual guest machine to a security virtual machine within a virtualization environment to receive security services, the security virtual machine configured to provide services to a number of guest virtual machines by receiving files from the number of guest virtual machines, scanning the files for malicious code, and responding to detections of malicious code, querying available security virtual machines within the virtualization environment from the guest virtual machine to obtain information about one or more other security virtual machines within the virtualization environment at the guest virtual machine, the information including one or more performance metrics, sorting the one or more other security virtual machines into a number of groups based on performance, the number of groups including a performance group based on at least one of the performance metrics, selecting an alternative security virtual machine from the performance group, and establishing a second connection to the alternative security virtual machine to receive security services at the virtual guest machine.

The information may include a list of the available security virtual machines provided from the security virtual machine. Selecting the alternative security virtual machine may include randomly selecting one of the security virtual machines in the performance group for use by the one of the guest virtual machines. Querying available security virtual machines may include polling the virtualization environment to locate available security virtual machines. The computer program product may further include creating a list of available security virtual machines by aggregating broadcast notifications from one or more security virtual machines within the virtualization environment. The computer program product may further include creating a list of available security virtual machines by polling one or more other guest virtual machines within the virtualization environment. Selecting the alternative security virtual machine may include selecting the alternative security virtual machine in response to a notification that the security virtual machine will terminate services. Selecting the alternative security virtual machine may include selecting the alternative security virtual machine in response to a determination that the guest virtual machine will migrate to a different physical host. The one or more performance metrics may be measured by the guest virtual machine. The one or more performance metrics may be reported to the guest virtual machine by the available security virtual machines. The computer program product may further include communicating the one or more performance metrics for the available security virtual machines within the virtualization environment to a management console for the virtualization environment. The performance group may include a lowest latency one of the security virtual machines and one or more other ones of the security virtual machines having a latency within a predetermined range of the lowest latency one of the security virtual machines.

In an aspect, a method disclosed herein includes establishing a first connection from a virtual guest machine to a security virtual machine within a virtualization environment to receive security services, the security virtual machine configured to provide services to a number of guest virtual machines by receiving files from the number of guest virtual machines, scanning the files for malicious code, and responding to detections of malicious code, receiving information about one or more other security virtual machines within the virtualization environment at the guest virtual machine, the information including one or more performance metrics, sorting the one or more other security virtual machines into a number of groups based on performance, the number of groups including a performance group based on at least one of the performance metrics, selecting an alternative security virtual machine from the performance group, and establishing a second connection to the alternative security virtual machine to receive security services at the virtual guest machine.

The method may further include maintaining the first connection and the second connection for receiving security services. The method may further include terminating the first connection after establishing the second connection. The method may further include providing a list of the one or more other security virtual machines to the security virtual machine from a management console for the virtualized computing environment, where receiving information about one or more other security virtual machines includes requesting the list from the security virtual machine. Receiving information about one or more other security virtual machines within the virtualization environment may include polling the virtualized computing environment to identify available security virtual machines. Receiving information about one or more other security virtual machines within the virtualization environment may include receiving periodic notifications from available security virtual machines within the virtualized computing environment. Selecting an alternative security virtual machine from the performance group may include randomly selecting an available security virtual machine from the performance group. The performance group may include a lowest latency one of the security virtual machines and one or more other ones of the security virtual machines having a latency within a predetermined range of the lowest latency one of the security virtual machines. The performance group may include one or more available security virtual machines with at least one of the performance metrics within a predetermined range. The method may further include managing virtual machine security resources.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale and are instead intended to illustrate the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein. Furthermore, each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
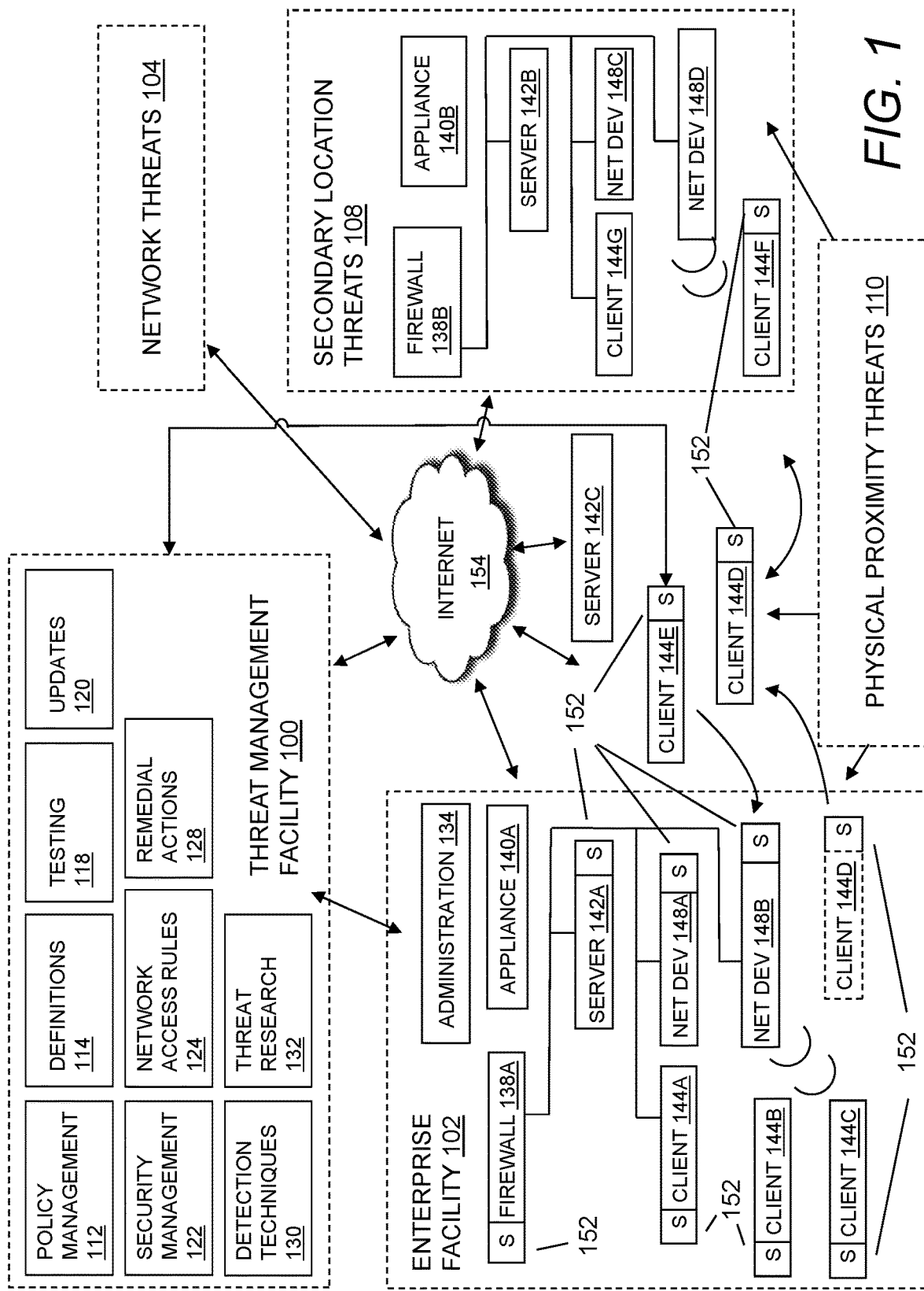
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. In one aspect, the policy management facility 112 may be used to update the policies of all corporate computing assets with a proper policy control facility or it may update a select few. By using the threat management facility 100 to facilitate the setting, updating and control of such policies a corporation only needs to be concerned with keeping the threat management facility 100 up to date on such policies. The threat management facility 100 can take care of updating all of the other corporate computing assets.

It should be understood that the threat management facility 100 may provide multiple services that may include policy management. We will now turn to a description of certain capabilities and components of the threat management system 100.

The threat management facility 100 may provide an enterprise facility 102 with protection from computer-based malware, including viruses, spyware, adware, Trojans, intrusion, spam, policy abuse, uncontrolled access, and the like. The enterprise facility 102 may be a networked computer-based infrastructure for any entity. The enterprise facility 102 may, for example, be a facility for any corporate, commercial, educational, or governmental enterprise or the like. The enterprise facility 102 may include a computer network, which may be distributed amongst a plurality of facilities and in a plurality of geographical locations. The enterprise facility 102 computer network may include administration 134, a firewall 138A, an appliance 140A, a server 142A, network devices 148A-B, clients 144A-D, and the like. The aforementioned devices within the enterprise facility 102 computer network may be protected by endpoint computer security facilities 152. It will be understood that any reference herein to client facilities may include the clients 144A-D shown in FIG. 1 and vice-versa.

The threat management facility 100 may provide a plurality of functions through components or platforms such as security management facility 122, a policy management facility 112, an update facility 120, a definitions facility 114, a network access rules facility 124, a remedial action facility 128, a detection techniques facility 130, a testing facility 118, a threat research facility 132, and the like. In embodiments, the threat protection provided by the threat management facility 100 may extend threat management functions beyond the network boundaries of the enterprise facility 102 to include clients 144D (or client facilities) that have moved into network connectivity not directly associated with or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into an area posing secondary location threats 108 such as when interfacing with components 140B, 142B, 148C, 148D that are not protected, and the like.

The threat management facility 100 may be provided as a stand-alone solution or may be integrated into or cooperate with one or more third-party products.

The security management facility 122 may be operable to scan the client facility files for malicious code, remove or quarantine certain applications and files, prevent certain actions, perform remedial actions, and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, the security management facility 122 may provide for web security and control, e.g., to help to detect or block viruses, spyware, malware, unwanted applications, help control web browsing, and the like. Web security and control may include Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic. In addition, network access control may control access to virtual private networks (VPN), where VPNs provide a communications network tunneled through another network to establish a logical connection and act as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Behavioral protection, as distinguished from runtime protection, can advantageously identify malicious code at a gateway or file servers and delete the code before it can reach endpoint computers and the like.

The security management facility 122 may provide reputation filtering to target or identify sources of known malware. For instance, reputation filtering may use lists of URIs of known sources of malware or known suspicious IP addresses, or domains that, when detected, invoke an action by the threat management facility 100, such as dropping packets, terminating connections or taking other remedial action. By dropping the source before any interaction can occur, potential threat sources may be thwarted before any exchange of data can be made.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, and so forth. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. The threat management facility 100 may also provide for the removal of applications that potentially interfere with the operation of the threat management facility 100, such as competitor products that may also be attempting similar threat management functions.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security management facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security management facility 122 and policy management facility 112 may push information to the enterprise facility 102 network and/or client facility. The enterprise facility 102 network and/or client facility may also or instead pull information from the security management facility 122 and policy management facility 112 network server facilities 142, or there may be a combination of pushing and pulling of information between the security management facility 122 and the policy management facility 112 network servers 142, enterprise facility 102 network, and client facilities, or the like. For example, the enterprise facility 102 network and/or client facility may pull information from the security management facility 122 and policy management facility 112 network server facility 142 may request the information using the security management facility 122 and policy management facility 112 update module; the request may be based on a certain time period, by a certain time, by a date, on demand, or the like. In another example, the security management facility 122 and policy management facility 112 network servers 142 may push the information to the enterprise facility's 102 network and/or client facility by providing notification that there are updates available for download and then transmitting the information.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The security management facility 122 may also be used to scan an outgoing file and verify that the outgoing file is permitted to be transmitted per the enterprise facility 102 rules and policies.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. The network access rules facility 124 may also or instead include rules, application logic or the like for controlling network access according to network policies and the like. The network access rule facility 124 may provide updated rules and policies to the enterprise facility 102.

When a threat or policy violation is detected by the threat management facility 100, the threat management facility 100 may perform or initiate a remedial action from the remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may monitor the enterprise facility 102 network or endpoint devices, such as by monitoring streaming data through the gateway, across the network, through routers and hubs, and the like. The detection techniques facility 130 may be used to monitor activity and stored files on computing facilities, such as on server facilities 142, desktop computers, laptop computers, other mobile computing devices, and the like.

The testing facility 118 may allow the administration facility 134 to coordinate the testing of the security configurations of client facility computing facilities on a network. For example, the administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134.

The threat research facility 132 may provide a continuously ongoing effort to maintain the threat protection capabilities of the threat management facility 100 in light of continuous generation of new or evolved forms of malware. Threat research may include research by human researchers and analysts working on known and emerging malware, such as viruses, rootkits a spyware, as well as other computer threats such as phishing, spam, scams, and the like. Threat research may also or instead include automated detection of new or emerging malware threats and the like. In embodiments, through threat research, the threat management facility 100 may be able to provide swift, global responses to the latest threats.

The threat management facility 100 may provide threat protection to the enterprise facility 102 including networked components such as client facility, server facility 142, administration facility 134, firewall 138, gateway, hubs and routers 148, threat management appliance 140, desktop users, mobile users, and the like. The endpoint computer security facility 152 located on a computer's desktop may also or instead provide threat protection to a user. The term endpoint, as used herein, may refer to a computer system that sources data, receives data, evaluates data, buffers data, or the like (such as a desktop computer, mobile device, server, or other computing device), a firewall as a data evaluation endpoint computer system, a laptop as a mobile endpoint computer, a personal digital assistant or tablet as a hand-held endpoint computer, a mobile phone as an endpoint computer, or the like. The term endpoint may also or instead refer to a source or destination for data.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be any application program or operating system that accepts client facility connections in order to service requests from clients 144. The server facility 142 application may run on the same computer as the client facility using it, or the server facility 142 and the client facility may be running on different computers and communicating across the network. A server facility 142 may also be an appliance facility 140, where the appliance facility 140 provides specific services onto the network. Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed.

Another component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a source with a low level of trust is the Internet 154, and more particularly, unknown sources of data on the Internet 154. A perimeter network forms a zone with an intermediate trust level situated between the Internet 154 and a trusted internal network. Since firewall facilities 138 may represent boundaries between threat levels (corresponding to boundaries between different networks), the endpoint computer security facility 152 associated with the firewall facility 138 may provide resources that control the flow of threats at this enterprise facility 102 network entry point. Firewall facilities 138, and associated endpoint computer security facility 152, may also be associated with a network node that is equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The Client facilities within the enterprise facility 102 or outside the enterprise facility 102 may be connected to the enterprise facility 102 network by way of wired network facilities 148A or wireless network facilities 148B, or any combination of these. Within areas exposed to secondary location threats 108, there may be no endpoint computer security facilities 152 at network components such as firewalls 138B, servers 142B, clients 144G, hubs and routers 148C-D, and the like. As a result, the computer components at such locations may be open to threat attacks, and become potential sources of threats, as well as any mobile enterprise facility clients 144B-F that may be connected to such locations. In this instance, these computer components may now unknowingly spread a threat to other components connected to the network, and it may be useful to track transitions into and of these secondary locations.

Having provided an overall context for threat detection, the description now turns to a brief discussion of an example of a computer system that may be used for any of the entities and facilities described above.

Figure 2:
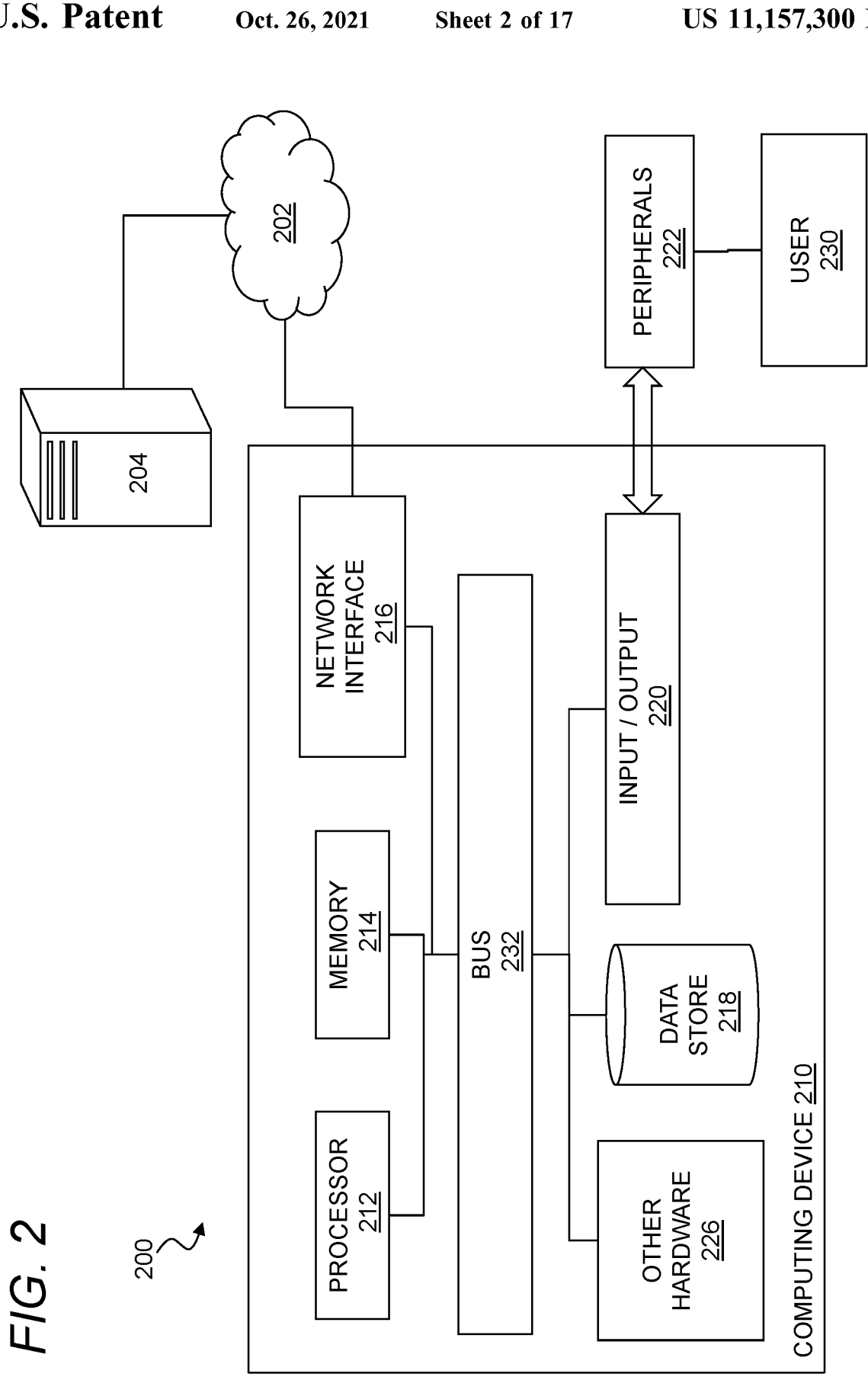
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may provide a physical or virtual device as a platform for any of the entities described in the threat management environment above with reference to FIG. 1. For example, the computing device 210 may be a server, a client, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer). The computing device 210 may be a standalone device, a device integrated into another entity or device, a platform distributed across multiple entities, or a virtualized device executing in a virtualization environment.

The network 202 may include the network 105 described above, which may be any data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and may generally be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, 5G, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

The computer system 200 may include a peripheral 222 for the computing device 210 such as any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control of or communications with other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
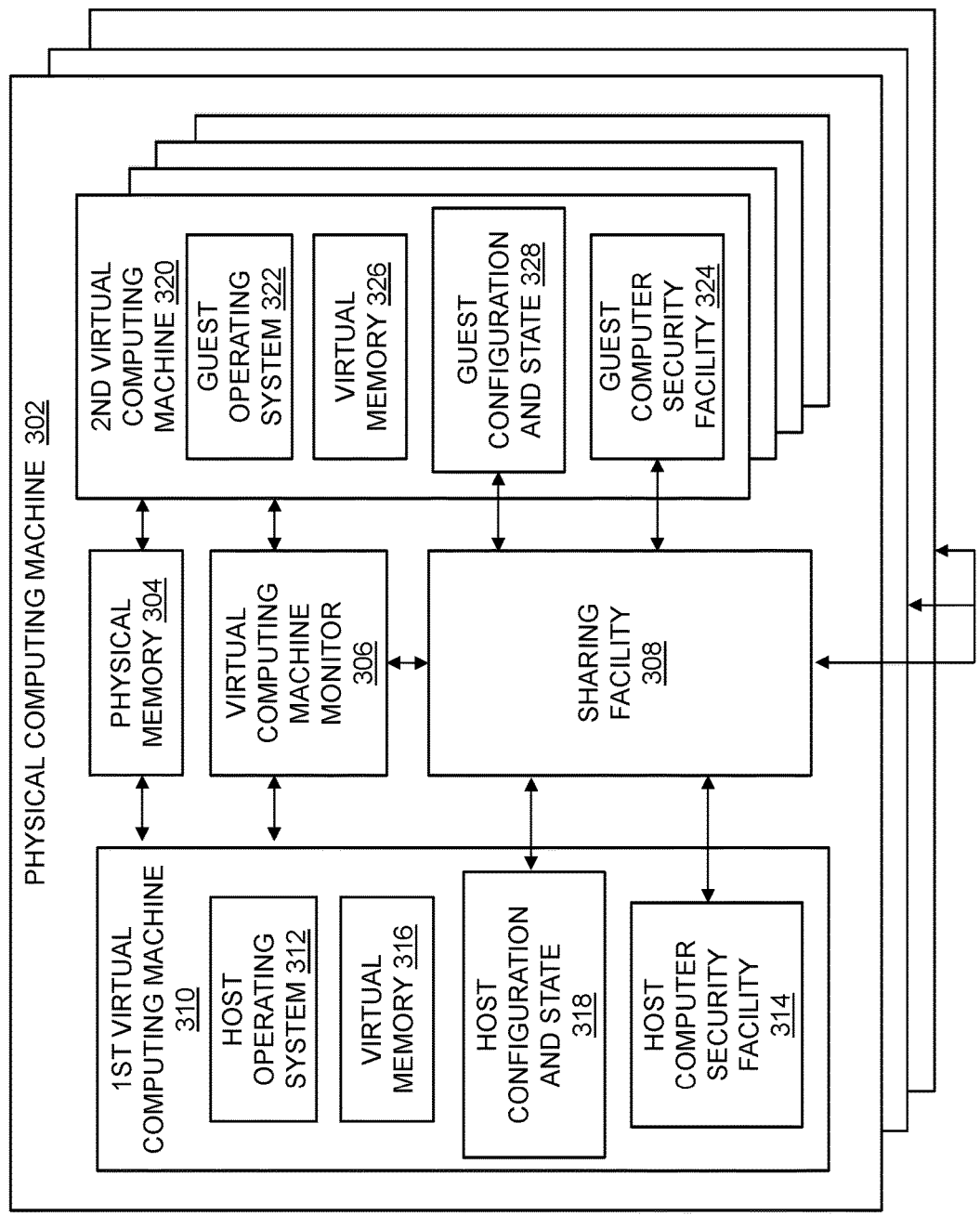
FIG. 3 illustrates a virtualized environment.

FIG. 3 illustrates a virtualized environment 300. The virtualized environment 300 may include a physical computing machine 302, a physical memory 304, a virtual computing machine monitor 306, a sharing facility 308, and one or more virtual computing machines which may include a first virtual computing machine 310 and a second virtual computing machine 320.

The physical computing machine 302 may include an endpoint client or a server such as any of the computing devices described above. The physical computing machine 302 may act as a single processing entity, where there is a single operating system on the machine, e.g., the host operating system 312 shown in the figure, and where this single processing entity has all of the physical resources of the machine available for its use. However, a computer may also be partitioned or multiplexed into a plurality of virtual computing machines, where each virtual computing machine runs its own operating system, e.g., the host operating system 312 and the guest operating system 322 shown in the figure.

A virtual computing machine configuration may be implemented to establish multiple isolated virtual machines on a single hardware platform, which permits machines to be added, removed, or reconfigured according to current demand. While this permits flexible deployment of computing resources, the size of memory on a physical device places corresponding limits on the number of virtual machines that can be instantiated before a new physical machine is required. For instance, a plurality of virtual computing machines configured on a single physical computing machine 302 may each have their own copies of an endpoint computer security facility, e.g., the first computer security facility 314 and the second computer security facility 324 shown in the figure, running on the same physical computing machine 302 and competing for shared physical resources such as processing capability and physical memory 304. This can place limitations on the capability of a single physical computing machine 302 in accommodating a large number of virtual computing machines. The techniques described herein can reduce the size of each virtual machine and thus increase the number of virtual computing machines on a single physical computing machine 302.

The virtual computing machine monitor 306 may include a hypervisor, e.g., a software program that supports virtualization of a number of virtual computer machines. Further, in embodiments, the virtual computing machine monitor 306 may run directly on the physical computing machine 302 as shown in the drawing, i.e., in association with an operating system. The virtual computing machine monitor 306 may receive and scan a file using any suitable techniques, or the virtual computing machine monitor 306 may transmit the file to another isolated environment for further testing and analysis. This separate virtual computing machine may act as a protective environment that isolates the file from other virtual machines. In addition, the separate virtual computing machine that initiated the isolation may now safely monitor shared information, such as state information, from outside the isolated virtual computing machine. This ability to create virtual computing machines that act as a protective environment, coupled with shared information, may provide an increased security for potentially harmful files and processes.

The sharing facility 308 may allow for the sharing of information and resources between virtual machines. In embodiments, providing a sharing facility 308 associated with the use of a plurality of virtual computing machines enables greater efficiencies in the use of physical memory 304 and processing in order to increase the number of virtual computing machines that may be accommodated with a single physical computing machine 302. The sharing facility 308 may also or instead decrease the overlap of software applications and processes, allow for the sharing of information between virtual computing machines to increase the efficiency of malware detection methods, decrease the overlap of malware scanning amongst virtual computing machines in order to decrease processing load, share system and application configuration and state information to provide greater system uniformity, and the like. In some implementations, the sharing facility 308 may be a shared data store. In some implementations, the sharing facility 308 may be implemented with one or more network communication protocols. In some implementations, the sharing facility 308 may be one or more network communication sockets. In some implementations, the sharing facility 308 may be one or more messaging facilities that operate in each virtual computing machine 310, 320 and the virtual computing machine monitor 306. In some implementations, the sharing facility 308 may be a virtual message bus that may be used for communication among one or more of the virtual computing machines 310, 320 and/or the virtual computing machine monitor 306.

Although FIG. 3 shows the physical computing machine 302 as including two virtual computing machines, i.e. the first virtual computing machine 310 and the second virtual computing machine 320, one skilled in the art will recognize that the physical computing machine 302 may include any number of virtual computing machines, and that the virtual computing machines may be distributed over two or more physical computing machines.

In general, the first virtual computing machine 310 may include a host operating system 312, a virtual memory 316, a host configuration and state facility 318, and the host computer security facility 314 referred to above, all of which may be instantiated on the physical computing machine 302. The first virtual computing machine 310 may serve as a hypervisor to manage a virtualized computing environment for other virtual machines instantiated on the physical computing machine 302 or in some more general context.

The host operating system 312 may include a program loaded onto the computer during boot time that controls other programs such as applications, background processes, and the like. The host operating system 312 may be associated with the virtual memory 316.

The virtual memory 316 may hold instructions related to the host operating system 312. The virtual memory 316 may also or instead hold information related to the host configuration and state facility 318, i.e. configuration and state information. The host configuration and state facility 318 may store information related to configuration such as operating system configuration information, firewall configuration, information application, configuration information, and the like.

The host computer security facility 314 may hold information related to security of the first virtual computing machine 310 such as detection of suspicious programs, malware detection, and the like.

The second virtual computing machine 320 may include a guest operating system 322, a virtual memory 326, a guest configuration and state facility 328, and the guest computer security facility 324 referred to above, all of which may be instantiated on the physical computing machine 302. The guest operating system 322 may be a different operating system than that included in the host operating system 312. The guest operating system 322 may also or instead store program instructions specific to the guest operating system 322 in the virtual memory 326. The virtual memory 326 may store configuration and state information specific to the second virtual computing machine 320. In addition, the virtual memory 326 may be associated with the guest configuration and state facility 328. The guest configuration and state facility 328 may be associated with the guest computer security facility 324. The guest computer security facility 324 may store the information related to malware and access control. In general, any number of guest virtual machines may be instantiated on the physical computing machine 302 and managed by the host machine, subject to physical limitations of the physical computing machine 302 and corresponding software.

The first virtual computing machine 310 and the second virtual computing machine 320 may share a common physical memory 304. The common physical memory 304 may store process information of programs associated with each of the virtual computing machines. The process information may include the processing time of a processing resource, the removal of a processing requirement of the virtual computing machines, and the like. In embodiments, the first virtual computing machine 310 and the second virtual computing machine 320 may be associated with the virtual computing machine monitor 306. The virtual computing machine monitor 306 may provide a software layer that implements virtualization for running multiple virtual computing machines. For example, the virtual computing machine monitor 306 may provide the software layer for each of the first virtual computing machine 310 and the second virtual computing machine 320.

In embodiments, the first virtual computing machine 310 and the second virtual computing machine 320 may be associated with the sharing facility 308. The sharing facility 308 may provide for the sharing of information between the virtual computing machines, and may include one or more software programs to facilitate such sharing.

Having provided an example of a virtualized environment, the description now turns to specific devices, systems, and methods for virtual machine security. The following security techniques may be used in addition to, in conjunction with, or to supplement the threat detection system, computer system, and virtualized environment described above. In another aspect, the devices, systems, and methods for virtual machine security are separate from any systems described above.

In general, the devices, systems, and methods described herein may advantageously allow for the installation, execution, and removal of security components onto virtual machines only when required or appropriate, avoiding a need for an installation of large malware detection and remediation code bases on new virtual machines. This approach advantageously increases the number of virtual machines that can be executed on a single physical device. Detection can be performed on the hypervisor or some other management console or other system for the virtual environment, and code for remediation can be deployed on an as-needed basis according to threat detection. To further improve performance, remediation code can be uninstalled or otherwise cleaned up or removed when remediation is complete. A variety of remediation functions can thus be deployed as-needed and without permanent software installation including without limitation full cleanup of malware, right-click scanning, on-demand scanning, rootkit scanning, rootkit cleanup, memory scanning, kernel memory scanning, and so forth.

Figure 4:
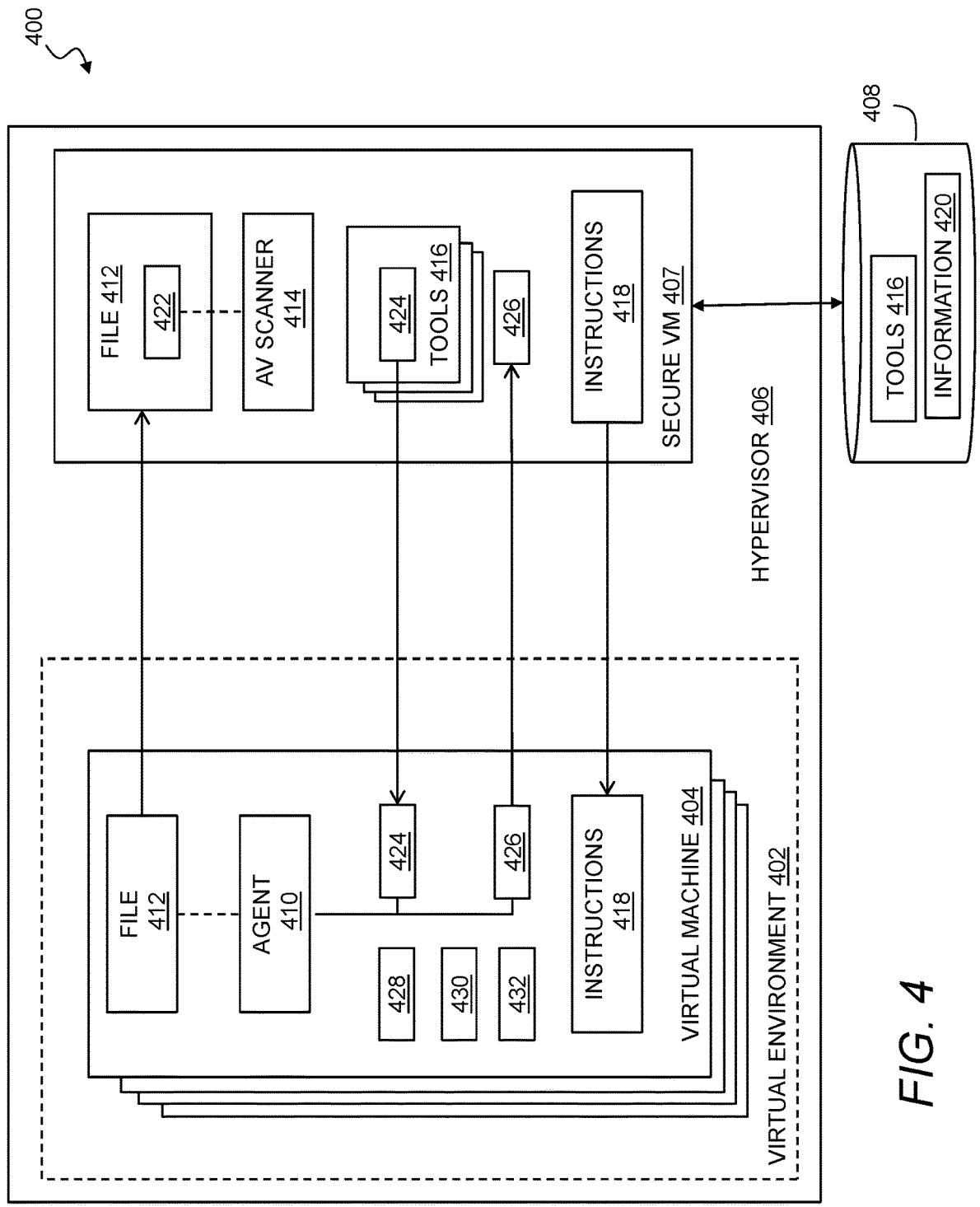
FIG. 4 illustrates a system for managing malware in a virtualized environment.

FIG. 4 illustrates a system 400 for managing malware in a virtualized environment. The system 400 may include a virtual environment 402 having one or more virtual machines 404, a hypervisor 406, one or more secure virtual machines 407, and a data store 408.

The virtual environment 402 and the one or more virtual machines 404 may be the same or similar to any as discussed elsewhere herein or otherwise known in the art. The one or more virtual machines 404 may include a first virtual machine having an agent 410.

The hypervisor 406 may be configured to manage a plurality of virtual machines 404. The hypervisor 406 may be co-located on a physical device hosting the virtual machines 404, or the hypervisor 406 may be a remote from the physical device. Similarly, the hypervisor 406 may be locally coupled to the virtual machines 404, or connected through a virtual or physical network for remote access to and management of the virtual machines 404.

The hypervisor 406 may host one or more of the plurality of virtual machines 404 and one or more secure virtual machines 407 that include components and the programmed logic for performing management and security functionality for the virtual machines 404. In general, the hypervisor 406 may include software that allows the virtual machines 404 to be run from a physical host. In an aspect, communication between the secure virtual machine 407 and the virtual machines 404 is undertaken via a network connection. The network connection may be a network connection with traffic that uses a physical network interface. The network connection may be a network connection with traffic that uses the same physical network interface. The network connection may be a virtual network connection that is maintained by the hypervisor 406 without use of a physical network interface. Although generally the secure virtual machine 407 hosted by the hypervisor 406 is described as performing various security functionality tasks for the virtual machines 404 (e.g., scanning and the like), one of ordinary skill will recognize that these tasks may also or instead be performed on the hypervisor 406, on another machine, and so on.

The hypervisor 406 may host a secure virtual machine 407 that includes an antivirus scanner 414 or the like. It should be understood that the term 'antivirus scanner' as used in this context is intended to refer broadly to any tool or the like that might be used to analyze the file 412 for potential threats. Thus, the antivirus scanner 414 may apply static analysis, behavioral analysis, contextual analysis, or any other technique or combination of techniques suitable for detecting malware. The secure virtual machine 407 hosted by the hypervisor 406 may also or instead include a plurality of tools 416 for malware-specific remediation. The secure virtual machine 407 may further include instructions 418, such as those for removing one or more of the tools 416 temporarily installed on the virtual machines 404. Alternatively, the secure virtual machine 407 may be in communication with a component that may include a plurality of tools 416 and instructions 418. Examples of such a component include the data store 408, a remote threat management facility, a third-party service, or the like. It will be understood that the antivirus scanner 414 and the tools 416 may be deployed on the secure virtual machine 407 hosted by the hypervisor 406, or at some other logical or physical location where they can be coordinated by the hypervisor 406.

Although shown as separately included on the secure virtual machine 407 hosted by the hypervisor 406, the antivirus scanner 414 may include the tools 416, instructions 418, and so on.

In an aspect, the secure virtual machine 407 is dedicated for the remediation of malware present on the other virtual machines 404. In an aspect, limiting the type of applications that are run on the secure virtual machine 407 may help protect the secure virtual machine 407 from malware attacks. The secure virtual machine 407 may also include additional security-related features. For example, the secure virtual machine 407 may use or maintain encrypted data storage. For example, the secure virtual machine 407 may limit access, for example by limiting access from certain network addresses or only directly from the hypervisor 406, or by having login requirements, such as two factor authentication or requiring certificates. For example, the secure virtual machine 407 may have an application to limit the processes that can run on the secure virtual machine 407 to a list of approved processes.

The data store 408 may include information 420 for use by one or more of the components of the system 400, e.g., the secure virtual machine 407 hosted by the hypervisor 406. The information 420 may include various forms of information useful for threat detection, analysis and remediation. For example, the information 420 may include a signature database for threat detection using static analysis. The information 420 may also or instead include reputation information that characterizes reputations of network locations, software publishers, and so forth. The information 420 may also or instead include information for behavioral analysis, or other information relevant to threat detection such as blacklists, whitelists, known malware components, and so forth. The information 420 may be based on historical data gathered by the system 400 or from an external resource such as a third-party threat management service.

In another aspect, the information 420 may include information useful for remediation of malware. This may include various tools 416 for remediating malware, including threat-specific tools, general remediation tools, configurable remediation tools, and so forth. This may also include updates, patches, policy revisions and the like useful for repairing or protecting specific vulnerabilities in the software footprint for a virtual machine.

The agent 410 may be a guest agent that monitors access to files 412 on one of the virtual machines 404, e.g., the first virtual machine. The agent 410 may monitor operation of the virtual machine 404, and detect when a file 412 is downloaded to the virtual machine 404 or accessed on the virtual machine 404 for the first time. In an aspect, the agent 410 is configured to respond to an initial access to the file 412 by transmitting the file 412 to an antivirus scanner 414 at a remote location, e.g., an antivirus scanner 414 disposed on the secure virtual machine 407 hosted by the hypervisor 406 or in communication with the secure virtual machine 407 or hypervisor 406. The agent 410 may be further configured to receive one of the plurality of tools 416 in response to transmitting the file 412 to the secure virtual machine 407 hosted by the hypervisor 406, or otherwise receive remediation instructions or code from the secure virtual machine 407 hosted by the hypervisor 406.

The file 412 may include one or more malware components 422, which may be detected and analyzed by the antivirus scanner 414 on the secure virtual machine 407 hosted by the hypervisor 406. The file 412 may be any type of file or program known in the art within such virtual environments 402. The file 412 may be a specific type of object that the agent 410 is programmed to send to the secure virtual machine 407 hosted by the hypervisor 406 when an access is detected, or any file 412 located on the virtual machine 404.

The plurality of tools 416 may include multiple configurations of a generic malware removal tool. The plurality of tools 416 may also or instead include specific removal tools for specific malware components 422 or full cleanup tools, e.g., fully loaded antivirus programs/applications and the like. The plurality of tools 416 may include tools for removing antivirus or anti-malware components installed on a virtual machine 404. For example, the virtual machine 404 may receive a first tool for removing malware components 422, and then a second tool for removing of the first tool after the first tool has remediated the malware threat.

The tools 416 may also or instead include other modules of functionality that can be used in the system 400 and deployed by the secure virtual machine 407. For example, the tools 416 may include one or more of a suspicious process inspection tool, a firewall (e.g., to block an infected machine accessing a network), a quarantining tool that blocks all network access, a communication module (e.g., to inform a user or administrator that a specific action has been undertaken), and so forth.

The instructions 418 may include removal instructions for any tools installed onto the virtual machine 404. The instructions 418 may also or instead include malware removal instructions, e.g., for use in conjunction with one or more of the plurality of tools 416.

The agent 410 may detect access to the file 412 on a virtual machine 404. The agent 410 may respond by transmitting the file 412 to the antivirus scanner 414 included on the secure virtual machine 407 hosted by the hypervisor 406. The secure virtual machine 407 may be configured to respond to receipt of the file 412 from the agent 410 of the virtual machine 404 by analyzing the file 412 with the antivirus scanner 414, e.g., for detection of a malware component 422.

When a malware component 422 is detected, the secure virtual machine 407 hosted by the hypervisor 406 may select at least one tool from the plurality of tools 416 thereby establishing a selected tool 424 for remediating the malware component 422. When the antivirus scanner 414 detects and specifically identifies the malware component 422 as a known malware component 422 based upon information 420 in the data store 408, the selected tool 424 may be a specific tool that corresponds to the known malware component 422. When the antivirus scanner 414 does not identify the detected malware component 422 as a known malware component 422, the selected tool 424 may be a generic tool for remediating malware. In an aspect, the generic tool is selected and then configured for the type of malware component 422 detected by antivirus scanner 414. To this end, the secure virtual machine 407 hosted by the hypervisor 406 may determine one or more actions required to remediate the malware component 422 and configure one or more of the plurality of tools 416, as described herein, to perform the one or more actions. The one or more actions may include one or more of a file deletion, a process termination, a removal of registry keys, and the like.

In an aspect, the selected tool 424 includes a rootkit removal tool. In another aspect, the selected tool 424 includes a full antivirus application or a threat specific removal tool.

The selected tool 424 may be transmitted by the secure virtual machine 407 hosted by the hypervisor 406 to the virtual machine 404.

The agent 410 may be configured to receive the selected tool 424 from the secure virtual machine 407 hosted by the hypervisor 406, install the selected tool 424 as necessary, and execute the selected tool 424. The agent 410 may be further configured to generate an execution status 426 for the selected tool 424 that indicates whether remediation of the malware component 422 was successful. The agent 410 may transmit the execution status 426 to the secure virtual machine 407 hosted by the hypervisor 406. In another aspect, the selected tool 424 may be configured to generate the execution status 426 and/or to transmit the execution status 426 to the secure virtual machine 407 hosted by the hypervisor 406. The execution status 426 may include one of: a 'success,' i.e. indicating that the remediation was successful; a 'failure,' i.e. indicating that the remediation could not be completed; an 'error,' i.e. indicating that the selected tool 424 could not be executed; and an 'incomplete,' i.e. indicating that one or more additional steps are required to complete the remediation. Other states are also possible. For example, the status may indicate that the agent 410 or selected tool 424 was unable to confirm or verify successful completion of the remediation.

The secure virtual machine 407 hosted by the hypervisor 406 may receive the execution status 426 from the agent 410 for the selected tool 424. When the execution status 426 indicates a successful remediation, the secure virtual machine 407 may transmit one or more instructions 418 to the virtual machine 404 to remove the selected tool 424. The agent 410 may be configured to respond to the instructions 418 by removing the selected tool 424 on the virtual machine 404, e.g., by uninstalling the selected tool 424, deleting any associated files, or otherwise cleaning up related components, icons, registry entries, and so forth. In another aspect, the selected tool 424 may be configured to self-uninstall or self-remove so that no intervention is required from the agent 410.

In another aspect, the agent 410 on the virtual machine 404 is configured to perform an on-demand scan, e.g., at a time selected by the secure virtual machine 407, a management console, or the like. The on-demand scan may include an installation of an antivirus tool 428, an execution of the antivirus tool 428, and a removal of the antivirus tool 428. The antivirus tool 428 may be the same or similar to any of the tools described herein, including without limitation a threat specific removal tool, a full antivirus application, or anything in-between. The virtual machine 404 may receive the antivirus tool 428 from the secure virtual machine 407 hosted by the hypervisor 406. The on-demand scan may be performed at any time that might be initiated by the agent 410 or the secure virtual machine 407 hosted by the hypervisor 406, e.g., on a predetermined schedule, after a detected compromise of the virtual machine 404 or other devices within an enterprise network or the like, or after a new and dangerous threat is identified elsewhere within an enterprise network.

In one aspect, the agent 410 on the virtual machine 404 may be configured to perform a rootkit scan using a rootkit scanner 430. To this end, the agent 410 may receive the rootkit scanner 430, e.g., from the secure virtual machine 407 hosted by the hypervisor 406, install the rootkit scanner 430 on the virtual machine 404, execute the rootkit scanner 430 on the virtual machine 404, uninstall the rootkit scanner 430 from the virtual machine 404, report a result of the rootkit scanner 430, e.g., to the secure virtual machine 407 hosted by the hypervisor 406, receive a rootkit removal tool responsive to the result, e.g., from the secure virtual machine 407 hosted by the hypervisor 406, install the rootkit removal tool on the virtual machine 404, execute the rootkit removal tool on the virtual machine 404, and uninstall the rootkit removal tool from the virtual machine 404.

In an aspect, the virtual machine 404 includes a user interface 432. The user interface 432 may be configured to receive a right-click scan request from a user for one or more files 412 included on the virtual machine 404. In general, this may be realized through a user interface tool that responds to a right mouse click or similar input when a cursor is hovering over an icon for a file or application by presenting an option to perform a security scan of the file. The user interface 432 may also or instead be configured for a user or administrator to schedule future scans and perform on-demand scans.

As referenced above, the plurality of tools 416 may include tools/components other than traditional malware remediation tools, such as a suspicious process inspection tool, a firewall, a quarantining tool, a communication module, and the like. For example, in one aspect, if the secure virtual machine 407 (e.g., through the antivirus scanner 414) detects specific files then the secure virtual machine 407 can transfer a tool to further analyze the behavior of the virtual machine 404-for example, for unexpected network traffic or unexpected processes, where these can be neutralized by the transmitted and installed tool. In another aspect, if the virtual machine 404 is infected and there is no remediation action known or available, the secure virtual machine 407 can transfer a tool to be installed that can block all network access, effectively quarantining the virtual machine 404 from the system/network until a remediation action is available. In yet another aspect, the secure virtual machine 407 can transfer a communication module for installation on the virtual machine 404, where the communications module informs a user that a specific action has been undertaken (e.g., that the virtual machine 404 has been quarantined from a network).

Figure 5:
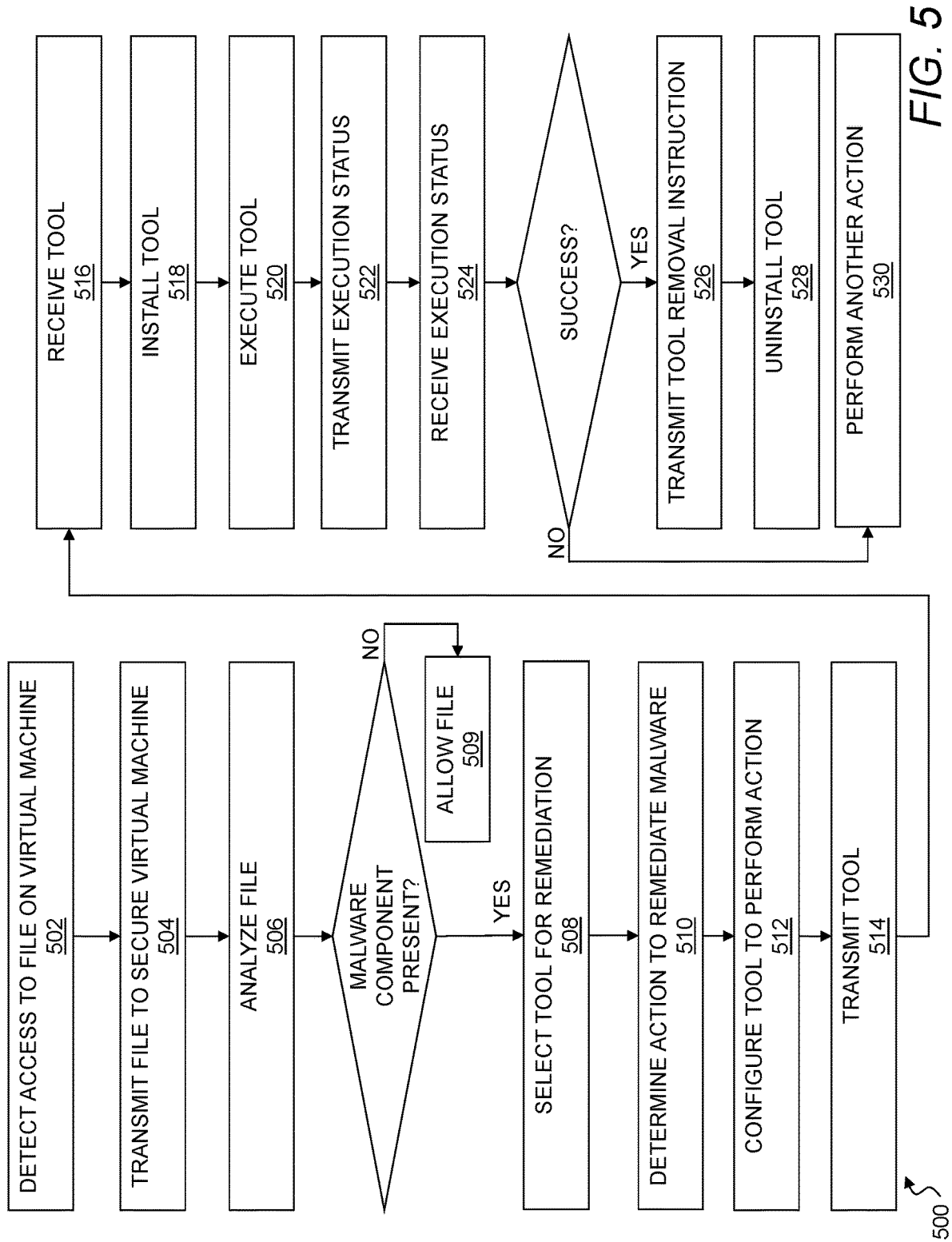
FIG. 5 is a flow chart of a method for managing malware in a virtualized environment.

FIG. 5 is a flow chart of a method 500 for managing malware in a virtualized environment. In an aspect, a computer program product comprising computer executable code embodied in a non-transitory computer readable medium that, when executing on one or more computing devices, such as any of those described herein, performs any or all of the steps the method 500 or any other methods described herein.

As shown in step 502, the method 500 may include detecting an access to a file on a virtual machine. In an aspect, detecting the access to the file includes receiving a right-click scan request for the file in a user interface of the virtual machine. Detecting access may also or instead include detecting a download of a new file to the virtual machine, detecting an unpacking of files from an installer or other compressed file container or the like, or an access to a file that is not recognized or previously opened on the virtual machine.

As shown in step 504, the method 500 may include transmitting the file to a secure virtual machine hosted by a hypervisor for the virtual machine. This may include transmitting locally or remotely to the secure virtual machine, according to an architecture of the virtualized environment and the relative location of the virtual machine, secure virtual machine, and the hypervisor within that environment.

As shown in step 506, the method 500 may include analyzing the file, e.g., with an antivirus scanner on the secure virtual machine hosted by the hypervisor. This may include analyzing the file using any suitable techniques. For example, this may include static analysis of the file using signatures or other information. This may also or instead include behavioral analysis, reputation analysis, and so forth. In another aspect, this may include executing the file in a sandbox or other isolated environment to detect possible malicious behavior. Where the file is compressed or otherwise packaged or grouped, or where the file includes attachments or the like this may also or instead include unpacking and inspecting the corresponding payload.

If the antivirus scanner does not identify a malware component, the method 500 may proceed to step 509 where the file is allowed to be accessed/run/executed on the virtual machine. In an aspect, the secure virtual machine may send instructions to the virtual machine that the file is whitelisted, clean, or otherwise approved to be accessed and used on the virtual machine. The method 500 may the optionally return to step 502 where a next access to another file is detected.

If the antivirus scanner identifies a malware component, the method 500 may proceed to step 508, which includes selecting one of a plurality of tools for malware-specific remediation of the malware component, thereby providing a selected tool. Selection of the tool may be performed by the secure virtual machine, e.g., an antivirus scanner on the secure virtual machine. To this end, the plurality of tools may be included on the secure virtual machine, where the plurality of tools may include multiple configurations of a generic removal tool, threat-specific removal tools, a full antivirus application or the like. In an aspect, the selected tool is a specific tool known to remediate a known malware component. In another aspect, the selected tool may be a generic tool that can be configured to remediate different types of threats. The secure virtual machine may instead select a full cleanup tool, e.g., a fully loaded antivirus program/application, for sending to the virtual machine, e.g., when an unknown malware component is identified. In another aspect the secure virtual machine or hypervisor may contact a threat management facility or other external service or the like for assistance in identifying a malware component or locating suitable remediation tools. The selected tool may also or instead access remote resources during execution to facilitate identification and remediation of malware.

As shown in step 510, the method 500 may include determining one or more actions required to remediate the malware component. The one or more actions may be determined based on a known malware component and/or identifiable properties of the malware component. The one or more actions may include a file deletion, a process termination, a removal of registry keys, and the like.

As shown in step 512, the method 500 may include configuring a removal tool to perform the one or more actions. For example, a generic removal tool may be configured to perform the one or more actions determined by the secure virtual machine to remediate the malware component. In another aspect, a specific removal tool is selected based upon an identified known malware component. The specific removal tool may still require configuration based upon actions that are known to be successful in remediating the malware component. Alternatively, the specific removal tool may not require any configuration before sending to the virtual machine for remediation of the malware component.

As shown in step 514, the method 500 may include transmitting the selected tool to the virtual machine. The tool may be transmitted from the secure virtual machine, or from some other repository or data source managed by the hypervisor. In another aspect, the tool may be transmitted from another component such as a third-party threat management facility or other remote threat management tool or resource.

As shown in step 516, the method 500 may include receiving the selected tool at the virtual machine. An agent on the virtual machine may receive the selected tool.

As shown in step 518, the method 500 may include installing the tool on the virtual machine. The tool may be installed temporarily on the virtual machine as described herein. It will be understood that some remediation software may not require installation, and may be immediately executable on the virtual machine. Other tools may require a restart of the virtual machine or some other installation step(s). Once the tool has been installed or otherwise prepared for use on the virtual machine, the tool may be executed.

As shown in step 520, the method 500 may include executing the tool on the virtual machine. The tool may be fully self-executing. That is, the tool may not require any user intervention. In another aspect, the tool (or the threat(s) being remediated by the tool) may require user intervention such as selection of remediation actions, verification that suspicious items are malicious, decisions on removal versus quarantine, and so forth.

As shown in step 522, after executing the tool, the method 500 may include generating and transmitting an execution status to the secure virtual machine or hypervisor. In an aspect, the execution status is selected from a group consisting of: a success indicating that the remediation was successful, a failure indicating that the remediation could not be completed, an error indicating that the selected tool could not be executed, and an incomplete indicating that one or more additional steps are required to complete the remediation. In general, the execution status may be generated by a local agent executing on the virtual machine and managing malware detection and remediation, or by the tool that performed the remediation, or some combination of these.

As shown in step 524, the method 500 may include receiving the execution status for the selected tool at the secure virtual machine. The secure virtual machine, hypervisor, or another component in the system, e.g., a data store, may store the execution status with other execution statuses received from virtual machines. In this manner, a historical database of malware remediation for one or more virtual environments may be formed. The historical database can be utilized by the secure virtual machine in selecting tools and determining actions to remediate specific malware components. The historical database may also or instead include information related to the files/objects that were scanned, e.g., the types of files, the malware components detected, and so forth.

As shown in step 526, when the execution status indicates a success for a remediation, the method 500 may include transmitting a tool removal instruction to the virtual machine. The tool removal instruction may be configured to permanently remove the tool that was installed on the virtual machine for remediating the malware component.

As shown in step 528, the method 500 may include uninstalling the selected tool on the virtual machine. Uninstalling the selected tool on the virtual machine may be performed by the agent on the virtual machine in response to the tool removal instruction. Uninstalling the selected tool on the virtual machine may involve permanently removing the selected tool on the virtual machine thereby freeing up memory and processing capacity on the virtual machine.

As shown in step 530, when the execution status does not indicate a success for a remediation, the method 500 may include performing another action. The other action may include, without limitation: removing the file from the virtual machine; determining one or more different actions to remediate the malware and configuring a tool accordingly to perform the one or more different actions; selecting a different tool for remediation; contacting a third-party threat management service; contacting an administrator; sending a notification; and so forth.

Figure 6:
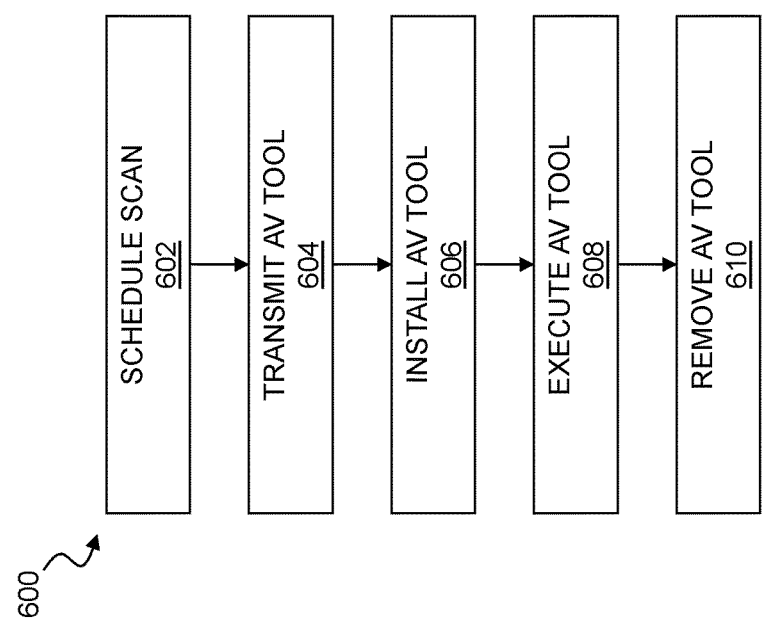
FIG. 6 is a flow chart of a method for managing malware in a virtualized environment using a scheduled scan.

FIG. 6 illustrates a method 600 for managing malware in a virtualized environment using a scheduled scan. The method 600 may be similar to other methods described herein, or the method 600 may supplement other methods described herein, i.e., where a tool selected by the secure virtual machine includes an antivirus tool, which can include, e.g., a threat specific tool or a full antivirus application.

As shown in step 602, the method 600 may include scheduling an on-demand scan for the virtual machine with the hypervisor at a predetermined time. The on-demand scan may be scheduled for a predetermined future time (and/or to recur at predetermined intervals), or the on-demand scan may occur immediately. An administrator or user may manually schedule the on-demand scan, or another entity, such as the hypervisor, may automatically schedule the on-demand scan. A user or administrator may schedule an on-demand scan for the virtual machine through the virtual machine user interface.

As shown in step 604, the method 600 may include transmitting an antivirus tool (e.g., a scanning specific tool or a full antivirus application) to the virtual machine at the predetermined time. In an embodiment where the antivirus tool is a full antivirus application, the antivirus tool may be configured to conduct a full antivirus scan. The antivirus tool may also or instead include one or more tools to facilitate remediation of any malware components identified/detected during an antivirus scan. The tools may automatically execute on the virtual machine when malware components are identified or detected.

As shown in step 606, the method 600 may include installing the antivirus tool on the virtual machine. In general, this may include executing an installer, installing the tool, unpacking the tool and any associated files, adding registry entries, icons, and the like or otherwise adding program code and related content for the application to execute. This may also include a restart of the virtual machine, closing of any applications that might interfere with the installation, or any other steps to complete the installation.

As shown in step 608, the method 600 may include executing the antivirus tool on the virtual machine. In general, it is contemplated that a scheduled scan will include a full antivirus scan, however, other approaches are possible. For example, the antivirus tool may be customized for a particular machine, or specific set of files or directories, or may be customized according to a known patch or update status for the machine so that unnecessary remediation components are not included.

As shown in step 610, the method 600 may include removing the antivirus tool from the virtual machine. In general, this may include uninstalling the tool, deleting the tool and associated files, deleting an installer (if any), deleting associated registry entries, icons, and the like or otherwise removing related software and cleaning up related material. This may also include a restart or other steps to complete the uninstallation.

Figure 7:
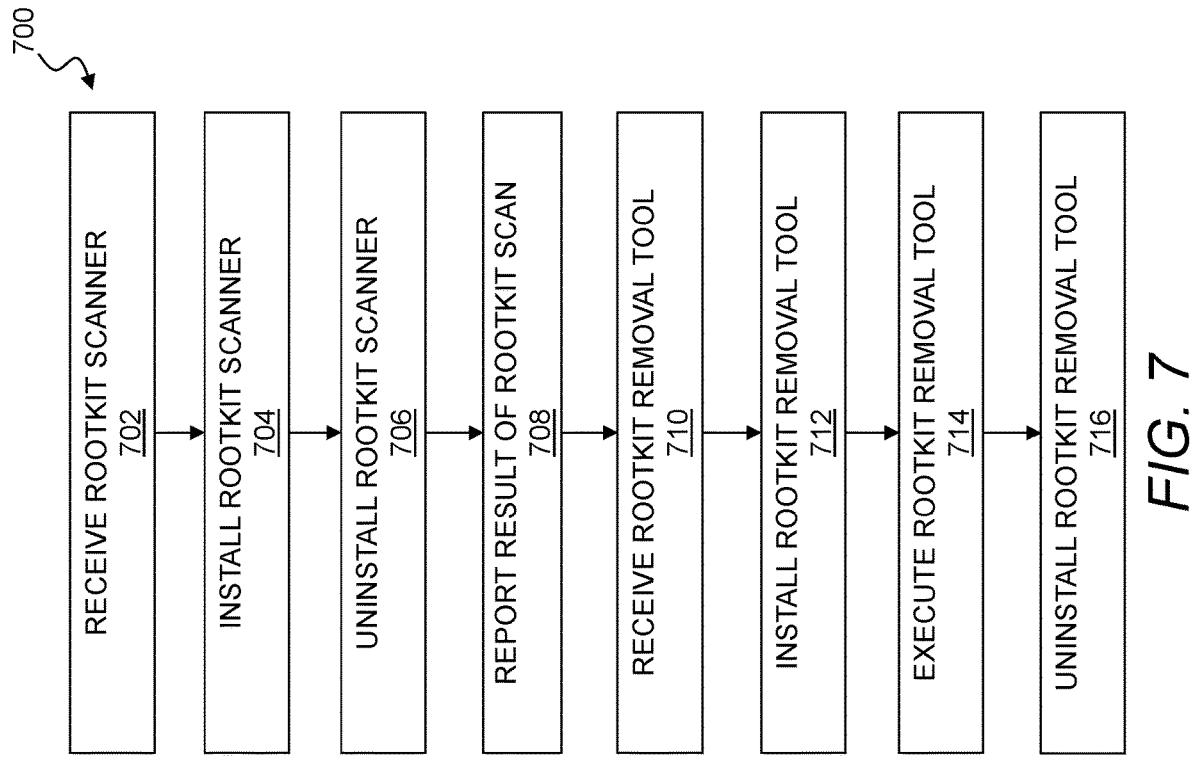
FIG. 7 is a flow chart of a method for managing malware in a virtualized environment using a rootkit scanner.

FIG. 7 is a flow chart of a method 700 for managing malware in a virtualized environment using a rootkit scanner. The method 700 may be similar to other methods described herein, or may supplement other methods described herein, i.e. where a tool selected by the secure virtual machine includes a rootkit removal tool.

As shown in step 702, the method 700 may include receiving a rootkit scanner at the virtual machine. The rootkit scanner may be configured to detect and identify rootkits, i.e. malicious software designed to enable access to areas of the virtual machine or other components of the virtual environment that would not otherwise be permitted, such as when the rootkit masks its existence/identity. Such rootkits may include user mode rootkits, kernel mode rootkits, hypervisor level rootkits, firmware rootkits, and so forth. The rootkit scanner may detect rootkits through behavioral-based, signature-based, and difference-based methods, among others. Rootkits can be particularly difficult to detect and remove, and additional steps may be required to address rootkits. It will be appreciated that, while this procedure is intended specifically to work successfully with rootkits, the method 700 may also or instead be used with other similarly challenging malware exploits.

As shown in step 704, the method 700 may include installing the rootkit scanner. The rootkit scanner may be temporarily installed on the virtual machine. Once installed, the rootkit scanner may be executed on the virtual machine to perform a rootkit scan, which searches for rootkits on the virtual machine.

As shown in step 706, the method 700 may include uninstalling the rootkit scanner. This may also include any subsequent clean up steps such as a virtual machine restart, local process restarts, application restarts, context recovery, icon deletion, registry edits, and so forth.

As shown in step 708, the method 700 may include reporting a rootkit scan result to the secure virtual machine or hypervisor. The result that is reported to the secure virtual machine or hypervisor may be similar to the other results of malware tools/scans discussed herein, including without limitation, whether the rootkit scan was: a success, i.e. the rootkit scan was executed and returned a reliable result; a failure, i.e. the rootkit scan did not execute properly; an incomplete, i.e. indicating that one or more additional steps are required to complete the rootkit scan; and so forth. The result that is reported to the secure virtual machine or hypervisor may also or instead include a number of rootkits detected during the scan and the identity of each of the detected rootkits if known.

Upon receiving the result of the rootkit scan, the secure virtual machine may select a rootkit removal tool for transmitting to the virtual machine.

As shown in step 710, the method 700 may include receiving the rootkit removal tool responsive to the result at the virtual machine from the secure virtual machine. The rootkit removal tool may be a generic rootkit removal tool for a collection of known rootkits or a specific rootkit removal tool configured to remove a specific rootkit identified by the rootkit scanner.

As shown in step 712, the method 700 may include installing the rootkit removal tool. The rootkit removal tool may be temporarily installed on the virtual machine.

As shown in step 714, the method 700 may include executing the rootkit removal tool. The rootkit removal tool may work to remove the rootkit detected by the rootkit scanner on the virtual machine. Rootkits may affect kernel-level operation of a computer, or contain hacked device drivers or other system-level code, and as such the rootkit removal tool may require a number of restarts or other steps during the course of remediation. After the rootkit removal tool has completed a removal process, an execution status of the rootkit removal tool may be generated. The execution status of the rootkit removal tool may be the same or similar to other execution statuses discussed herein including an execution status selected from a group consisting of: a success indicating that the removal of the rootkit was successful, a failure indicating that the removal of the rootkit could not be completed, an error indicating that the rootkit removal tool could not be executed, and an incomplete indicating that one or more additional steps are required to complete the removal of the rootkit.

As shown in step 716, the method 700 may include uninstalling the rootkit removal tool, i.e., when the execution status indicates a successful removal of the rootkit. Uninstalling the rootkit removal tool may be facilitated by a tool removal instruction transmitted to the virtual machine from the secure virtual machine.

Several examples of virtual machine security will now be described.

Figure 8:
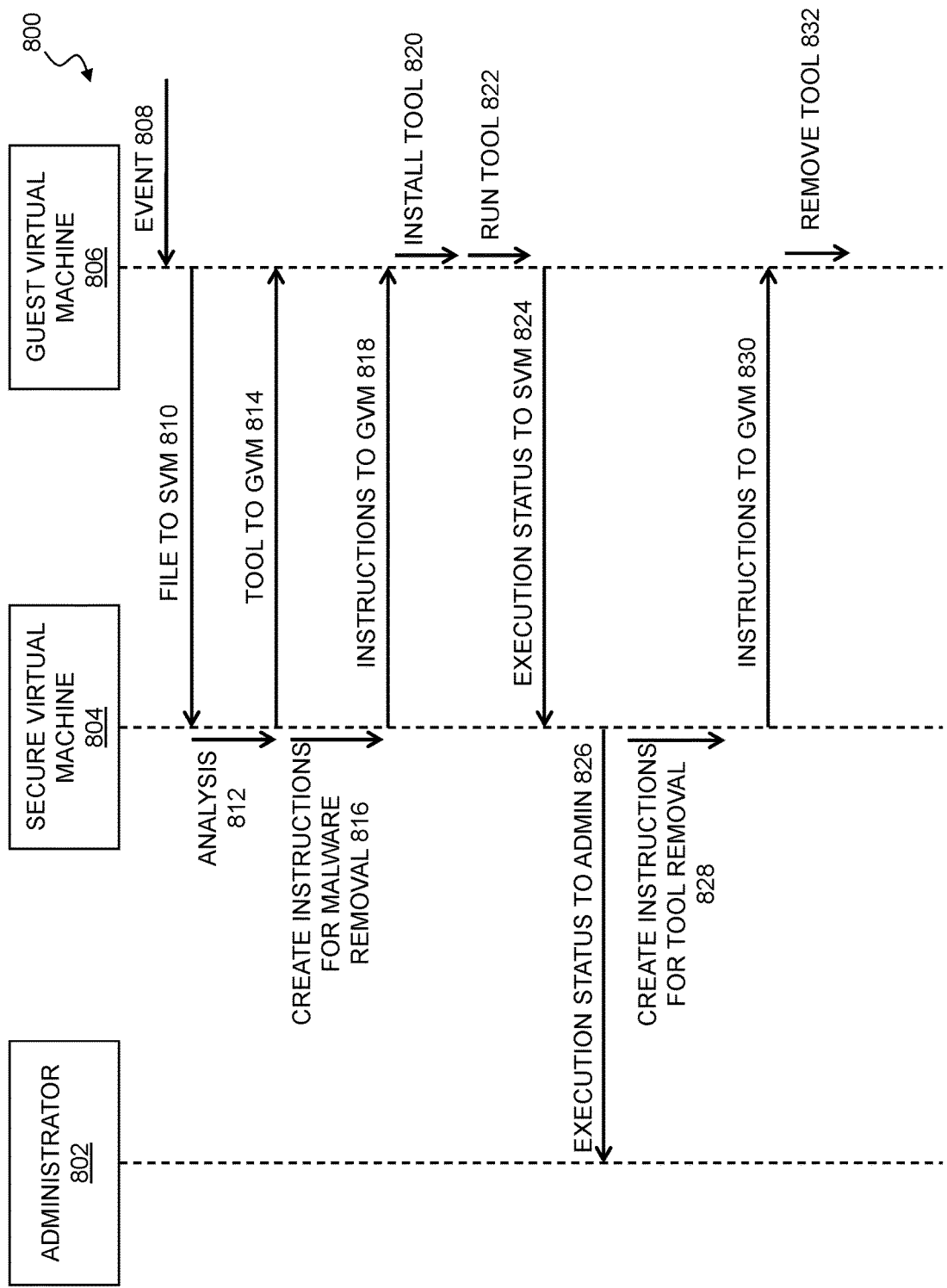
FIG. 8 is a signal diagram for a malware remediation process in a virtualized environment.

FIG. 8 is a signal diagram of a malware remediation process in a virtualized environment. As used herein, a full cleanup of malware may include one or more of a file deletion, a process termination, a removal of registry keys, and the like. The signal diagram depicts a system 800 including an administrator 802, a secure virtual machine 804 (SECURITY VIRTUAL MACHINE), and a guest virtual machine 806 (GUEST VIRTUAL MACHINE). The secure virtual machine 804 and guest virtual machine 806 may be any of the virtual machines described above.

In the prior art, in order to perform a full cleanup of malware, an antivirus (AV) application was typically installed on a guest virtual machine, where it was regularly updated with threat identities and a virus engine. This configuration can use significant memory, particularly where the AV application is a large executable with a substantial local database of threat information. In implementations described herein, however, a virus removal tool may be stored on a secure virtual machine 804 hosted by a hypervisor and then copied onto guest virtual machines 806 only when malware is detected. When a cleanup has been undertaken, the virus removal tool may be removed from the guest virtual machines 806.

As shown by arrow 808, an event may occur on the guest virtual machine 806. The event may include a file event, such as an attempt to access a file on the guest virtual machine 806.

As shown by arrow 810, when a file event is detected, the file may be passed from the guest virtual machine 806 to the secure virtual machine 804, e.g., through an existing communication path.

As shown by arrow 812, an analysis may be performed on the secure virtual machine 804. Specifically, the file may be analyzed by an antivirus application/scanner on the secure virtual machine 804 to determine whether, e.g., the file is malicious, the file includes a malware component, or the like.

As shown by arrow 814, a tool may be sent from the secure virtual machine 804 to the guest virtual machine 806, e.g., if a malware component is identified in the file by the secure virtual machine 804. The tool may include a virus removal tool or any of the other tools described herein.

As shown by arrow 816, the secure virtual machine 804 may create instructions for removal of the malware component. This may include selecting a suitable remediation program, configuring a suitable remediation program, creating code to coordinate installation and execution of one or more remediation programs, and so forth. More generally, the secure virtual machine 804 may determine what actions are need to remediate the detected malware and select a suitable program or group of programs to complete the needed remediation.

As shown by arrow 818, the secure virtual machine 804 may send the instructions to the guest virtual machine 806. In an aspect, the instructions are included as part of the tool that is transmitted to the guest virtual machine 806. The instructions may also or instead include a wrapper, macro, or other code to coordinate operation of the tool on the guest virtual machine 806.

As shown by arrow 820, the tool that was sent from the secure virtual machine 804 to the guest virtual machine 806 may be installed on the guest virtual machine 806.

As shown by arrow 822, the tool may be executed or run on the guest virtual machine 806. This may perform the operations/functionalities of the tool to remediate the malware component, e.g., removing files, terminating processes, removing registry keys, and the like.

As shown by arrow 824, the guest virtual machine 806 may send an execution status to the secure virtual machine 804. The execution status may include: success, i.e. that the remediation was successful; failure, i.e. the remediation failed indicating that the malware component could not be remediated by the tool; error, i.e. an error occurred, indicating that the tool could not be executed on the guest virtual machine 806; or incomplete, i.e. the remediation is incomplete and that one or more additional steps, such as a user task to reboot the virtual machine or the like, are required to complete the remediation.

As shown by arrow 826, the secure virtual machine 804 may send the execution status to the administrator 802. This may occur via a notification or the like on a console of the administrator 802, or through a message sent via email or the like.

As shown by arrow 828, the secure virtual machine 804 may create instructions for removing the tool.

As shown by arrow 830, the secure virtual machine 804 may send the instructions to the guest virtual machine 806 for removing the tool from the guest virtual machine 806.

As shown by arrow 832, the guest virtual machine 806 may remove the tool thereby completing a process for remediating malware on a virtual machine in the system 800.

Figure 9:
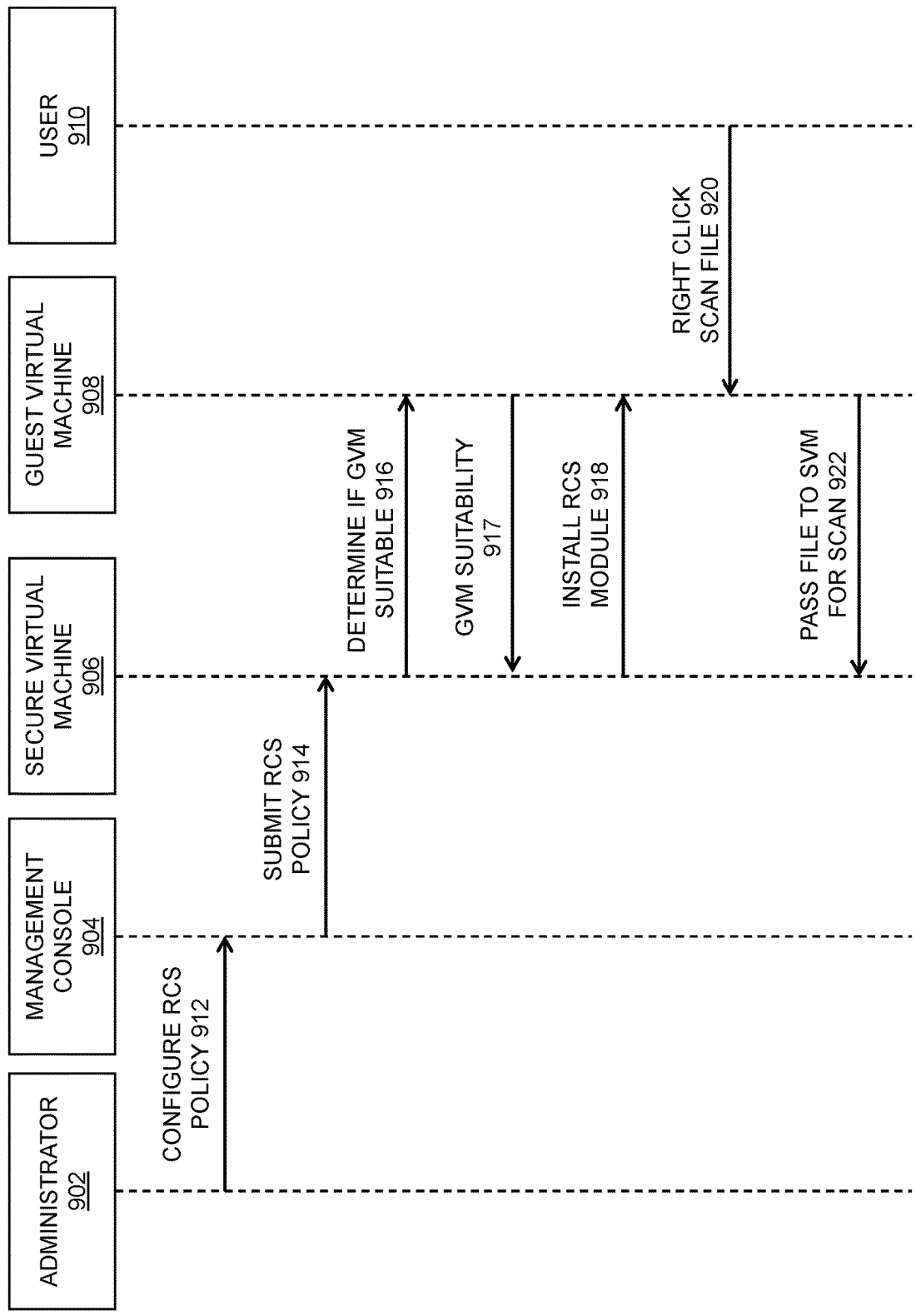
FIG. 9 is a signal diagram for a right-click scanning process in a virtualized environment.

FIG. 9 is a signal diagram for a right-click scanning process in a virtualized environment. As used herein, right-click scanning may refer to any user-initiated scanning, such as a mouse interaction with an icon for a file or application. In general, right-click scanning involves a local plug-in or the like that is installed on a machine where the scan is performed. However, this approach is generally inconsistent with the techniques described herein for host-side file evaluation. As such, adaptations are described herein for applying the malware scanning and remediation techniques described herein to a right-click scanning user experience.

The signal diagram depicts a system 900 including an administrator 902, a management console 904, a secure virtual machine 906, a guest virtual machine 908, and a user 910.

As shown by arrow 912, the administrator 902 may configure the right-click scanning (RCS) policy on the management console 904. This may include the establishment of rules for the virtual environment or system 900 such as when right-click scanning is enabled, what types of malware the right-click scan might search for, and any other parameters that might affect use of a user-initiated right-click scan on a virtual machine. For example, while scanning may still be performed remotely from the virtual machine, a client-side program or software component will generally be required for provide the corresponding user interface functionality. The policy may be used to determine whether this is appropriate or helpful for certain machines, and may be used to avoid installation of such features on a machine such as file server that does not typically host user access.

As shown by arrow 914, the right-click scanning policy may be submitted to the secure virtual machine 906.

As shown by arrow 916, the secure virtual machine 906 may determine whether the guest virtual machine 908 is suitable for the right-click scanning policy. This may include a determination as to whether the guest virtual machine 908 has a suitable platform for the right-click scanning policy, or whether right-click scanning should be enabled for a particular user. The determination as to whether the guest virtual machine 908 is suitable for the right-click scanning policy may also or instead be based on the purpose of the guest virtual machine 908 in the system 900.

As shown by arrow 917, the suitability of the guest virtual machine 908 may be sent back to the secure virtual machine 906, e.g., whether the right-click scanning module can be installed on the guest virtual machine 908. If the right-click scanning module can be installed on the guest virtual machine 908, the right-click scanning module may be transmitted to the guest virtual machine 908 for installation. If the right-click scanning module cannot be installed on the guest virtual machine 908, another action might be taken including without limitation configuring the guest virtual machine 908, configuring the right-click scanning module, selecting another right-click scanning module or other scanner, notifying the administrator 902, and so forth.

As shown by arrow 918, if the guest virtual machine 908 is suitable for the right-click scanning policy, a right-click scanning module may be installed onto the guest virtual machine 908 by the secure virtual machine 906. The right-click scanning module may include a temporary plugin or other code for receiving or responding to a right-click scan.

As shown by arrow 920, once the right-click scanning module is installed on the guest virtual machine 908, the user 910 may perform right-click scanning. The user 910 may thus right-click scan a file on the guest virtual machine 908. The right-click scan may include a selection of a file for scanning, i.e. by the right-click scanning module or by the secure virtual machine 906.

As shown by arrow 922, the selected file may be passed to the secure virtual machine 906 for further scanning.

Figure 10:
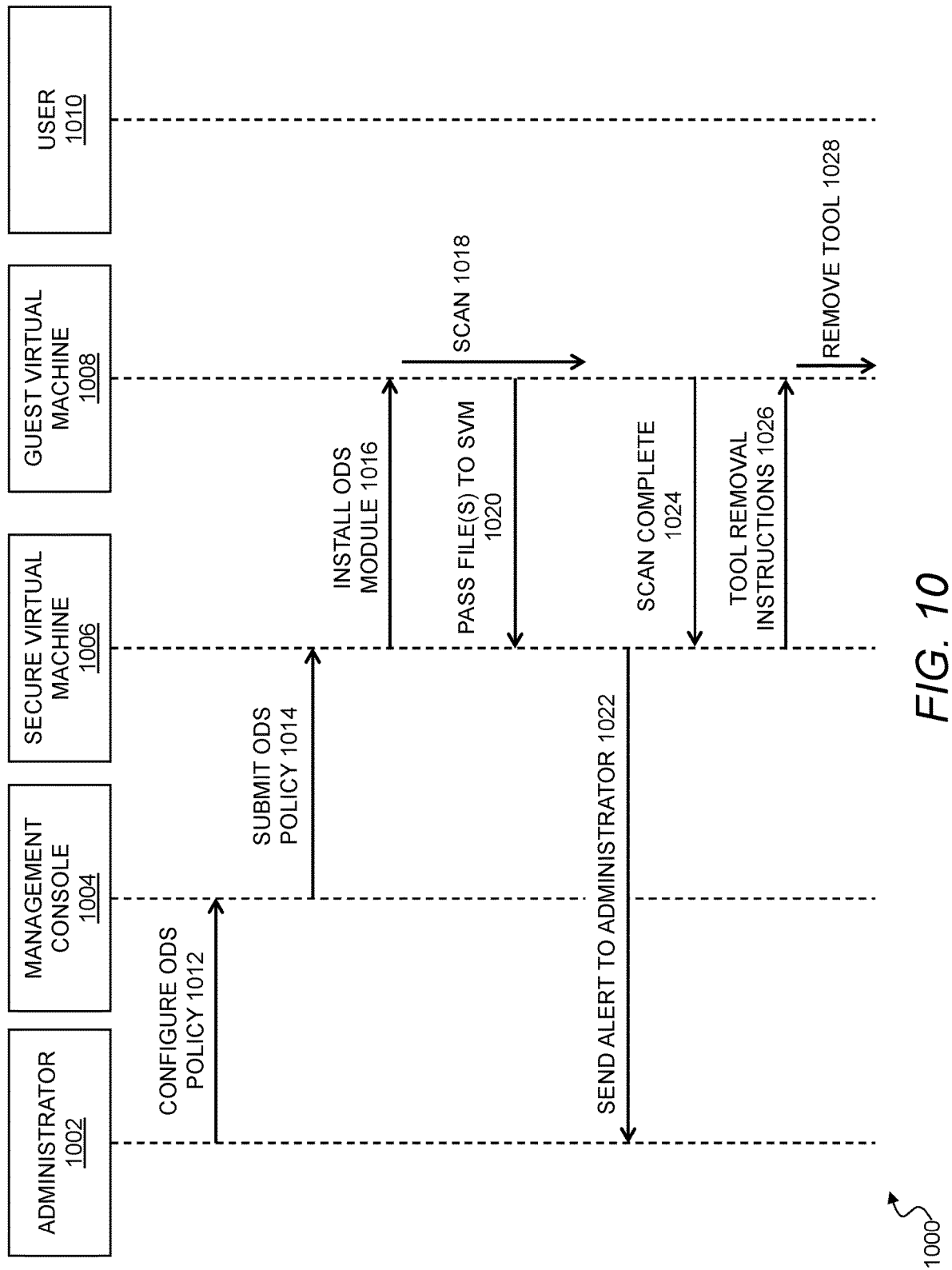
FIG. 10 is a signal diagram for a process for on-demand scanning in a virtualized environment.

FIG. 10 is a signal diagram of an on-demand scanning process in a virtualized environment. In the prior art, in order to facilitate on-demand scanning (ODS), an application, e.g., a full antivirus application, is typically installed on the guest virtual machine, where the application can access each file in turn. Implementations may improve upon these techniques by having the host virtual machine install a relatively small module on the guest virtual machine when the on-demand scan is due. The host virtual machine or module may determine which files are to be excluded from the scan, and then pass each file to be scanned to the host virtual machine for scanning. When the scan is complete the module may remove itself. Thus, a module may be configured and installed on a virtual machine, such as within the guest agent described above, to filter files that should be scanned remotely.

The system 1000 may include an administrator 1002, a management console 1004, a secure virtual machine 1006, a guest virtual machine 1008, and a user 1010.

As shown by arrow 1012, the administrator 1002 may configure the on-demand scan on the management console 1004. This may include specifying when on-demand scans can or should be performed, what files should be included or excluded, and so forth.

As shown by arrow 1014, the on-demand scan policy may be submitted to the secure virtual machine 1006.

As shown by arrow 1016, an on-demand scanning module may be sent from the secure virtual machine 1006 to the guest virtual machine 1008 for installation on the guest virtual machine 1008. This may occur when the on-demand scan is set to begin. The on-demand scanning module may determine that certain files or directories are to be excluded from the on-demand scan so that a scan of the guest virtual machine 1008 can proceed accordingly.

As shown by arrow 1018, the on-demand scan may be initiated on the guest virtual machine 1008. Thus, the scanning may occur on the guest virtual machine 1008 without copying files to the guest virtual machine 1008, as the scanning tool contains the configuration and malware detection identities that may be needed. The on-demand scan may scan any files, objects, directories and the like that are not explicitly excluded by the on-demand scanning module.

As shown by arrow 1020, during the on-demand scan on the guest virtual machine 1008, files selected from the scan may be transmitted to the secure virtual machine 1006, e.g., if the scanning tool determines that additional analysis is required. If a file or directory is excluded, it is not passed to the secure virtual machine 1006, which can save valuable scanning time.

As shown by arrow 1022, if malware is detected, an alert may be sent to the administrator 1002 from the secure virtual machine 1006. This may occur through an alert sent through or received on the management console 1004, and remediation may be undertaken as more generally described above.

As shown by arrow 1024, the guest virtual machine 1008 may notify the secure virtual machine 1006 when the scan is complete.

As shown by arrow 1026, when the scan is complete, the secure virtual machine 1006 may send tool removal instructions to the guest virtual machine 1008.

As shown by arrow 1028, the tool may be removed from the guest virtual machine 1008, e.g., using the tool removal instructions. The tool removal instructions may then also be removed from the guest virtual machine 1008, thereby freeing up more processing capacity or memory on the guest virtual machine 1008.

Figure 11:
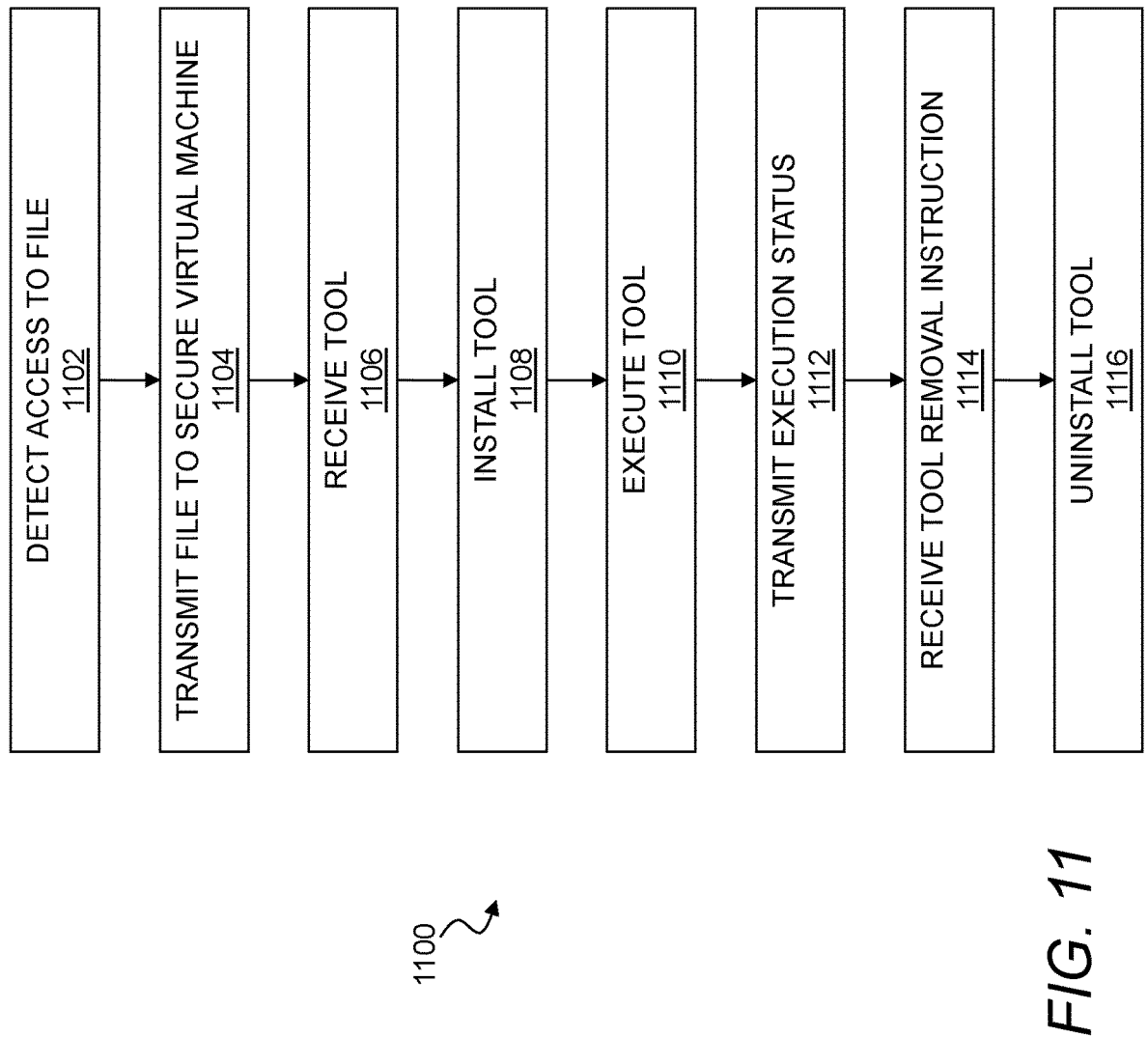
FIG. 11 is a flow chart of a method for operating a virtual machine to detect and remediate malware.

FIG. 11 is a flow chart of a method 1100 for operating a virtual machine to detect and remediate malware.

As shown in step 1102, the method 1100 may include detecting an access to a file on a virtual machine. This may include access by any process executing on the virtual machine such as the first time a file is identified or opened. This may also or instead include file detection in response to a right-click scan, an on-demand scan of a directory, or any other user-initiated or machine-initiated discovery of or use of a file.

As shown in step 1104, the method 1100 may include transmitting the file to a secure virtual machine hosted by a hypervisor for the virtual machine.

As shown in step 1106, the method 1100 may include receiving a tool at the virtual machine. The tool may include a tool selected by the secure virtual machine for malware-specific remediation of a known malware component identified in the file.

As shown in step 1108, the method 1100 may include installing the tool on the virtual machine. It will be appreciated that this may include installing a program, restarting the virtual machine, closing applications that might interfere with the installation, or any other steps suitable for completing installation of the tool. In another aspect, the tool may execute directly as an executable file without any need for installation. In another aspect where the malware is a rootkit or the like, this may also include a preliminary receipt and installation of a rootkit detection tool, followed by uninstallation of the rootkit detection tool and an installation of a rootkit remediation tool As shown in step 1110, the method 1100 may include executing the tool on the virtual machine.

As shown in step 1112, the method 1100 may include transmitting an execution status to the secure virtual machine. The execution status may be generated by the virtual machine or another component, where the execution status is based on the performance of the tool in remediating the malware component.

As shown in step 1114, the method 1100 may include receiving a tool removal instruction from the secure virtual machine.

As shown in step 1116, the method 1100 may include responding to the tool removal instruction by removing the tool from the virtual machine, such as by uninstalling the tool, deleting a file containing the tool, removing an icon, registry entries, or other components of the tool, or any other suitable deletion, uninstallation, and cleanup procedures.

Figure 12:
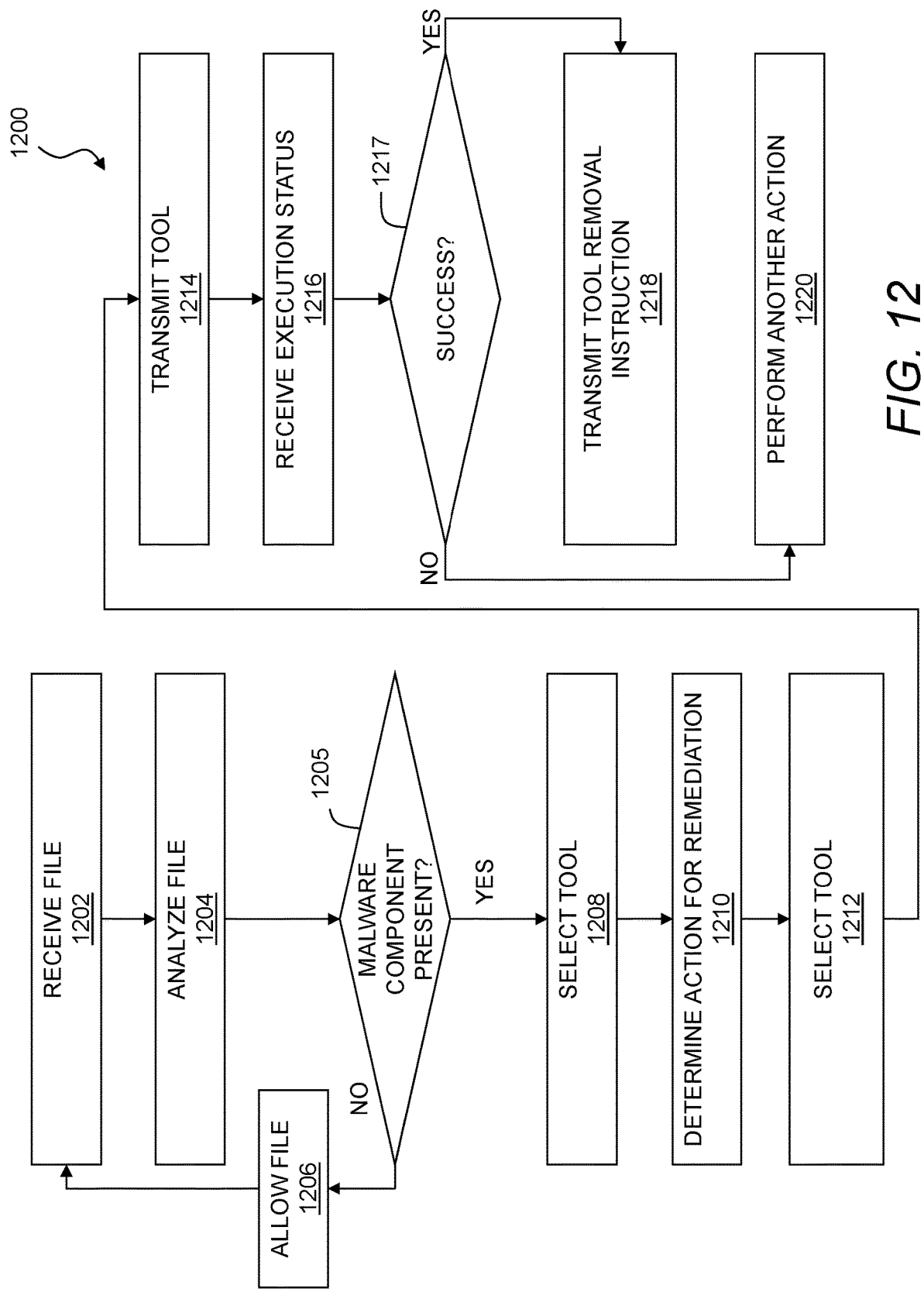
FIG. 12 is a flow chart of a method for operating a secure virtual machine hosted by a hypervisor to detect and remediate malware in a virtualization environment.

FIG. 12 is a flow chart of a method 1200 for operating a secure virtual machine hosted by a hypervisor to detect and remediate malware detection in a virtualization environment.

As shown in step 1202, the method 1200 may include receiving a file at the secure virtual machine. The file may include a file for which access was detected on a virtual machine, a file for which a right-click scan was requested, or any other file identified by a virtual machine as suitable for malware scanning. The file may be received from an agent on the virtual machine.

As shown in step 1204, the method 1200 may include analyzing the file, e.g., with an antivirus scanner on the secure virtual machine hosted by the hypervisor.

As shown in step 1205, the file may be analyzed for the presence of a malware component. As shown in step 1206, when the antivirus scanner does not identify a malware component, the method 1200 may include allowing access to the file, allowing the file to open/execute/run, and so forth, thereby ending the method 1200. As shown in step 1208, when the antivirus scanner identifies a known malware component, the method 1200 may include selecting one of a plurality of tools for malware-specific remediation of the known malware component. The plurality of tools may include multiple configurations of a generic removal tool.

As shown in step 1210, the method 1200 may include determining one or more actions required to remediate the known malware component.

As shown in step 1212, the method 1200 may include selecting a tool for performing remedial actions. As described above, this may include selecting a malware-specific tool, selecting a generic malware tool, customizing a configurable malware tool, and so forth. The secure virtual machine may thus provide a selected tool for use by the virtual machine.

As shown in step 1214, the method 1200 may include transmitting the selected tool to the virtual machine.

As shown in step 1216, the method 1200 may include receiving an execution status for the selected tool, which may be evaluated by the secure virtual machine as shown in step 1217.

As shown in step 1218, when the execution status indicates a success for a remediation, the method 1200 may include transmitting a tool removal instruction to the virtual machine.

As shown in step 1220, when the execution status does not indicate a success for a remediation, the method 1200 may include performing another action. This may include, without limitation: removing the file from the virtual machine; determining one or more different actions to remediate the malware component and configuring a tool these additional or different actions; selecting a different tool for remediation; and so forth. More generally, a variety of execution statuses may be received from the virtual machine, with corresponding possible actions by the secure virtual machine according to whether the outcome was incomplete, inconclusive, or otherwise uncertain.

Figure 13:
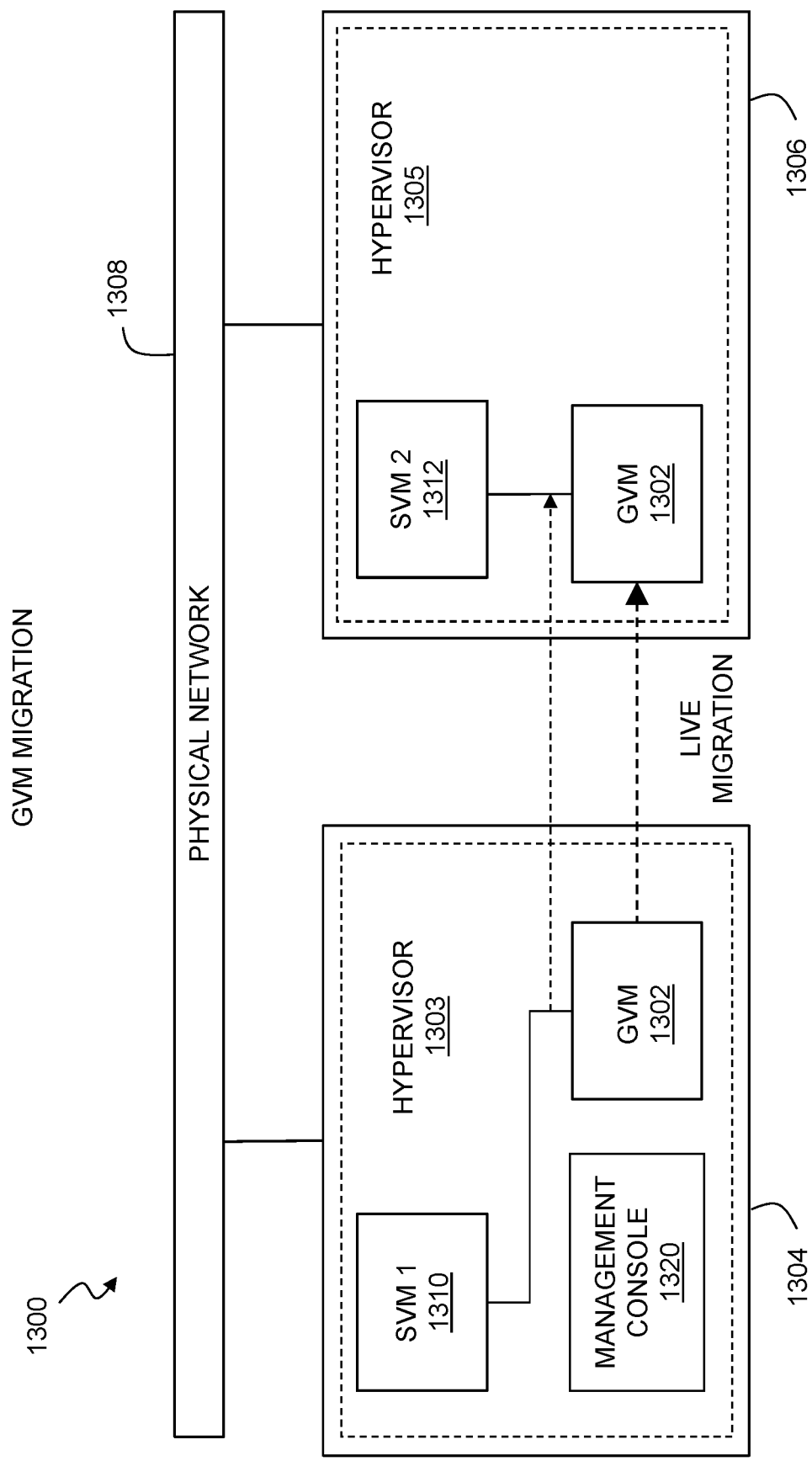
FIG. 13 illustrates a context for a transition between security virtual machines in a virtualized computing environment.

FIG. 13 illustrates a context for a transition between security virtual machines in a virtualized computing environment 1300. In general, one or more hypervisors 1303, 1305 may be configured to provide a virtualized computing environment or (also referred to herein as a virtualized environment) to virtual machines such as any of the guest virtual machines, security virtual machines or other machines (such as a management console or the like) described herein. The guest virtual machine 1302, and a plurality of other guest virtual machines may be executing in the virtualized computing environment of the one or more hypervisors, and may be distributed over two or more physical computing devices 1304, 1306 coupled in a communicating relationship with one another through a physical data network 1308. A plurality of security virtual machines executing on the physical computing devices 1304, 1306 in the virtualized environment provided by the hypervisors 1303, 1305 may generally provide security services to the guest virtual machines. It will be appreciated that, notwithstanding the exemplary system 1300 illustrated in FIG. 13, the virtualized environment may include any number of hypervisors, security virtual machines, guest virtual machines, physical computing devices and physical networks. In this context, the physical data network 1308 may include any suitable network for interconnecting physical devices including a wide area network, local area network, or internetwork of any of the foregoing, as well as a back plane or other hardware for directly, locally, physically coupling two or more machines in a communicating relationship. A management console 1320 may be used by an administrator or the like to manage the security virtual machines 1310, 1312, the guest virtual machine 1302, and other resources within the virtualized environment. It will also be understood that, while a change in physical location is one context where it may be useful to change or manage connections to security virtual machines, the techniques described herein may also or instead be usefully employed on a single physical machine, e.g., to address load balancing or compromised performance one or more security virtual machines.

FIG. 13 more specifically illustrates a migration of a guest virtual machine 1302 from one hypervisor 1303 on a first physical computing device 1304 to a second hypervisor 1305 on a second physical computing device 1306, where the two physical computing devices 1304, 1306 are separated by physical network 1308. In an initial deployment, the guest virtual machine 1302 may receive security services from a first security virtual machine 1310 on the first physical computing device 1304. For any number of reasons, ranging from updates or maintenance on the hypervisor for the first physical computing device 1304 to load balancing or physical relocation, the guest virtual machine 1302 may be proactively migrated from the first physical computing device 1304 to the second physical computing device 1306. The guest virtual machine 1302 may initially default to the first virtual security machine 1310 for security services. However, where the new physical location is known, the guest virtual machine 1302 may also usefully transition proactively to the second security virtual machine 1312. While this may include a transition to a predetermined security virtual machine on the destination physical device, a new security virtual machine may also be chosen using the various techniques described herein, which may generally facilitate a selection of a new source for security services from among a number of security virtual machines providing a minimum threshold of performance. As described above, the guest virtual machine 1302 may include a security agent locally executing on the guest virtual machine 1302 to manage communications with a current one of the security virtual machines.

The security virtual machines 1310, 1312 may provide a variety of security services to guest virtual machines, including file scanning, network traffic monitoring and so forth. Thus, each guest virtual machine in the virtualized environment may be coupled to one of the security virtual machines to receive security services therefrom. As described herein, each guest virtual machine may be configured to respond to a change in connectivity with one of the security virtual machines (e.g., a current one of the security virtual machines providing security services to the guest virtual machine) by searching for another one of the plurality of security virtual machines for security services. This search, and a subsequent selection of one of the security virtual machines may, for example, be based on one or more selection criteria such as a latency of data communications with the security virtual machines, a bandwidth for data communications with the security virtual machines, and a quantity of the guest virtual machines currently receiving security services from each of the plurality of security virtual machines.

A number of changes in network status may trigger a search for a new security virtual machine. For example, the change in connectivity may include a loss of connectivity to the current one of the security virtual machines, e.g., where the current security virtual machine stops responding to requests for file scans or other security services. The change in connectivity may also or instead include a decrease in quality of connectivity to the current security virtual machine. Thus, for example, where the current security virtual machine exhibits a decrease in bandwidth or an increase in latency, e.g., beyond a predetermined threshold, one of the guest virtual machines may initiate a search for a new security virtual machine with more favorable performance characteristics. A window may also be used for the decrease in quality of connectivity. That is, a search for a new security virtual machine may be deferred until a duration of the decrease in quality exceeds a predetermined time. This can mitigate continuous hopping from security virtual machine to security virtual machine each time there is a brief dropout in service, which may be due to transient factors such as a temporary, large demand for processing from another guest virtual machine. The change in connectivity may also or instead include an improvement in a quality of connectivity to one or more other ones of the security virtual machines. Again, in order to avoid spurious transitions among security virtual machines, such a change may be limited to instances in which the improvement in the quality of connectivity to other security virtual machines yields connectivity significantly greater than a current connection to a current security virtual machine.

The guest virtual machine 1302 may use a variety of techniques to facilitate a selection of a new security virtual machine. For example, searching for another one of the security virtual machines may include querying each one of the plurality of security virtual machines in a virtualized environment. The guest virtual machine 1302 may locate such security virtual machines, e.g., by broadcasting a request for responses from security virtual machines, or by requesting a list of available machines from the management console 1320. The guest virtual machine 1302 may also be initially configured and launched with a list of available security virtual machines within the virtualized environment. The management console 1320 may also or instead distribute a list of available security virtual machines to each security virtual machine 1310, 1312 within the virtualized environment so that each security virtual machine can store information about other security virtual machines, and the guest virtual machine 1302 can simply query a security virtual machine that is currently providing security services for information about other security virtual machines. In another aspect, the management console 1320 may respond directly to queries from the guest virtual machine 1302. Where the guest virtual machine 1302 maintains an internal list of security virtual machines with corresponding information about connectivity, either from actively polling the virtualized environment, from monitoring broadcasts, e.g., from security virtual machines for the management console 1320, the guest virtual machine 1302 may search for a new security virtual machine using a local query or inspection of the local list.

Selecting one of the plurality of security virtual machines may also employ a variety of techniques intended, e.g., to balance load among security virtual machines and/or to locate a suitably performing security virtual machine within the virtualized environment without overloading a particular security virtual machine. Thus, for example, selecting one of the plurality of security virtual machines for security services may randomly selecting one of the plurality of security virtual machines from among a group of the plurality of security virtual machines having a healthy state, e.g., where the healthy state is determined based on at least one of a software patch status, a software update status, an antivirus scan of the corresponding security virtual machines, and a connectivity of a security virtual machine to a threat management facility. Selecting one of the plurality of security virtual machines for security services may also or instead include randomly selecting one of the plurality of security virtual machines from among a group of the plurality of security virtual machines providing adequate connectivity. This may, for example, include connectivity within a top percentile for latency (e.g., a top third, a top quartile or a top decile), within a top percentile for bandwidth, or within a predetermined range of a lowest latency one of the security virtual machines. Other predictors of suitable load or performance may also or instead be used, such as a current number of guest virtual machines being serviced by a security virtual machine or a distance through the physical network between the guest virtual machine and the security virtual machine.

Figure 14:
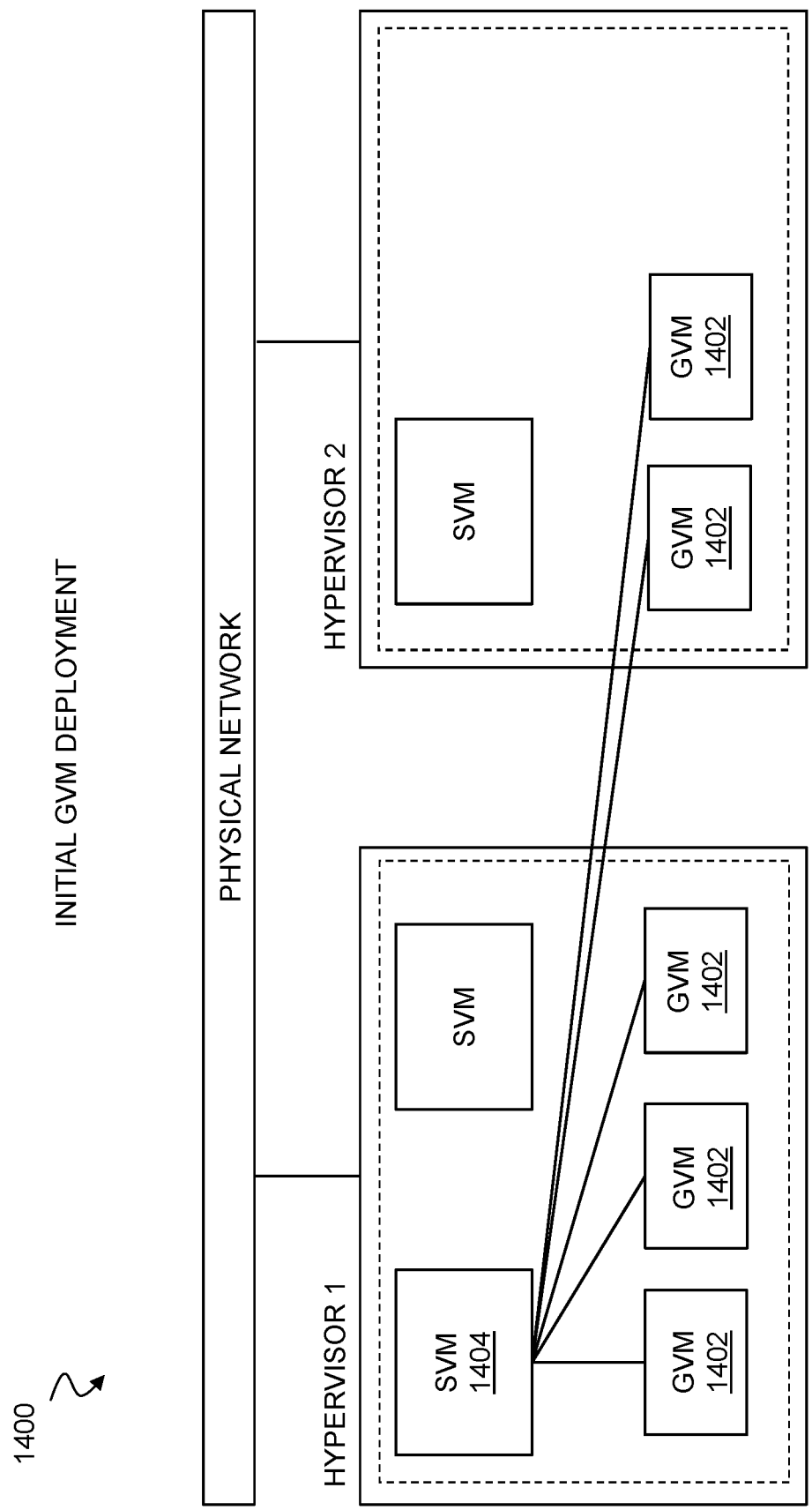
FIG. 14 illustrates a context for a transition between security virtual machines in a virtualized computing environment.

FIG. 14 illustrates a context for a transition between security virtual machines in a virtualized computing environment 1400 such as any of the virtualized computing environments described herein. In particular, FIG. 14 shows an initial deployment of guest virtual machines 1402, such as any of the guest virtual machines described herein, in which a group of guest virtual machines 1402 all initially receive security services from a single security virtual machine 1404, such as any of the security virtual machines described herein. For example, each new guest virtual machine 1402 may initially be launched in a configuration that defaults to a specific security virtual machine 1404. In one aspect, this security virtual machine 1404 may usefully maintain a list of other available security virtual machines to facilitate an efficient transition to other security resources where appropriate.

Figure 15:
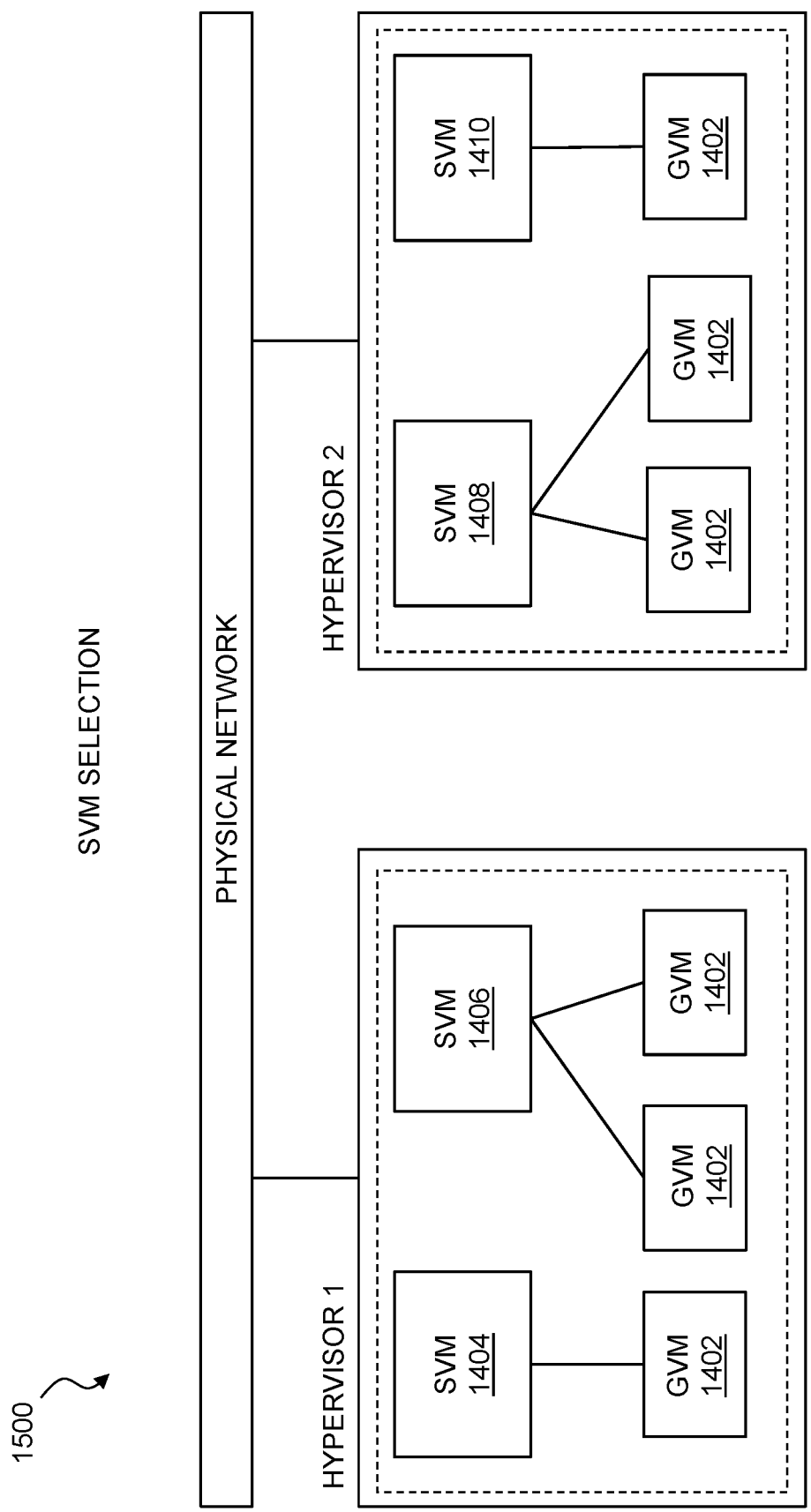
FIG. 15 illustrates a context for a transition between security virtual machines in a virtualized computing environment.

FIG. 15 illustrates a context for a transition between security virtual machines in a virtualized computing environment 1500 such as any of the virtualized computing environments described herein. In particular, FIG. 15 illustrates a redistribution of security virtual machines providing services after a selection process as contemplated herein. For example, the initial deployment shown in FIG. 14 resulted in all guest virtual machines 1402 connected to (and receiving security services from) a single security virtual machine 1404. However, this may result in decreased performance of the security virtual machine 1404, as manifested in an increased latency when responding to specific requests for security services. Thus, some of the guest virtual machines 1402 may, over time, detect a decrease in performance and search for other suitable security virtual machines, such as the other security virtual machines 1406, 1408, 1410, 1412 in the virtualized environment. As a result of this search and, e.g., a random selection of other suitably performing providers, the guest virtual machines 1402 may migrate to other ones of the security virtual machines 1406, 1408, 1410, resulting in a distribution of connections as illustrated, by way of example, in FIG. 15.

Figure 16:
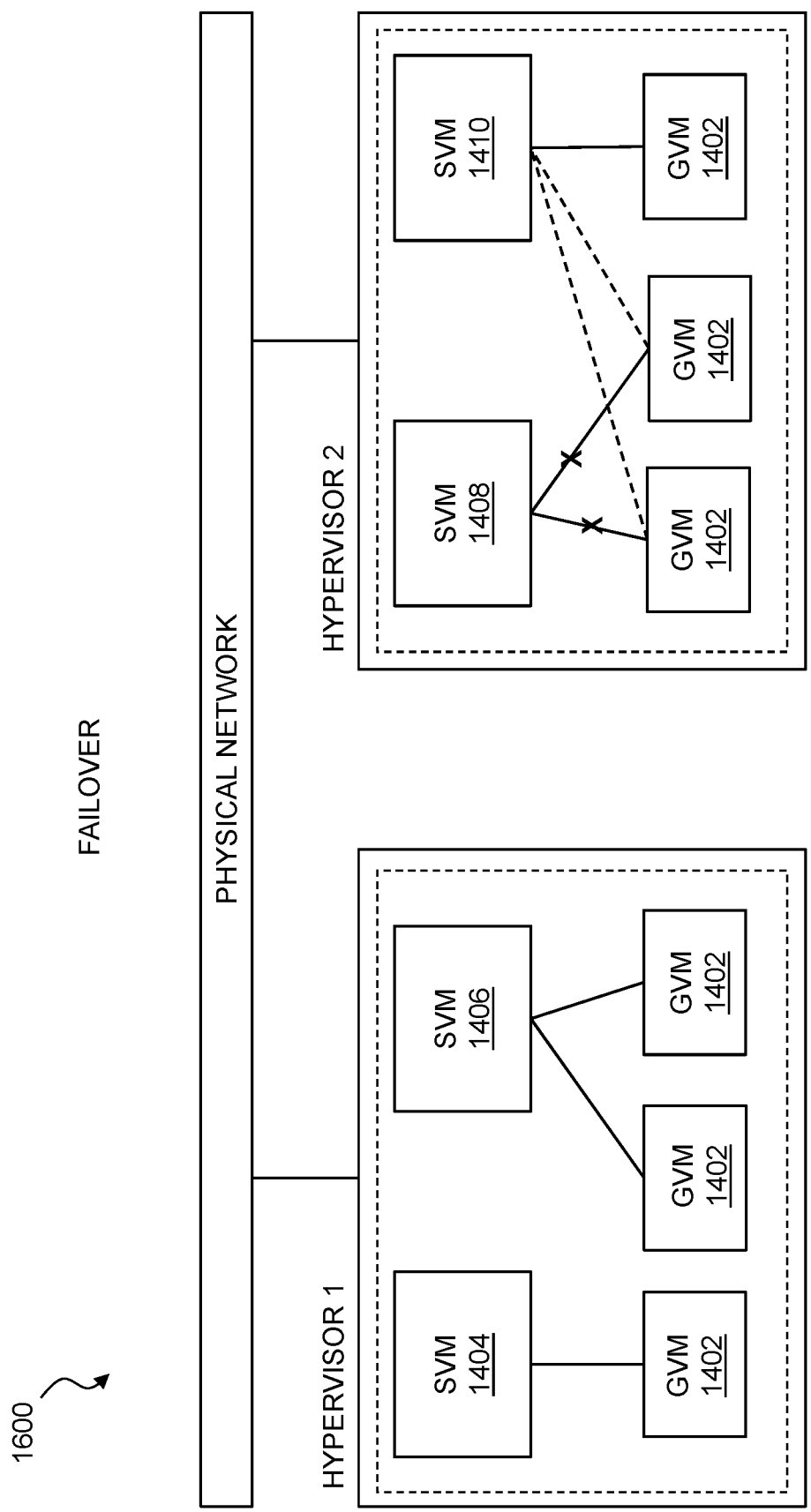
FIG. 16 illustrates a context for a transition between security virtual machines in a virtualized computing environment.

FIG. 16 illustrates a context for a transition between security virtual machines in a virtualized computing environment 1600. As shown in FIG. 16, one of the security virtual machines 1408 may no longer provide suitable security services. This may, for example, result from overloading of the security virtual machine 1408, a virtual machine crash, a planned termination for updates or other maintenance, or the like. As a result, the guest virtual machines 1402 connected to the security virtual machine 1408 may begin searching for other security virtual machines and may, for example, locate and select another security virtual machine 1410 as a source of security services. Thus, a group of security virtual machines 1404, 1406, 1408, 1410 may dynamically disconnect from and reconnect to the plurality of guest virtual machines 1402 over time in a manner generally configured to balance security resources across a number of machines and/or ensure that guest virtual machines 1402 receive suitably timely security services within the virtualized environment 1600.

Figure 17:
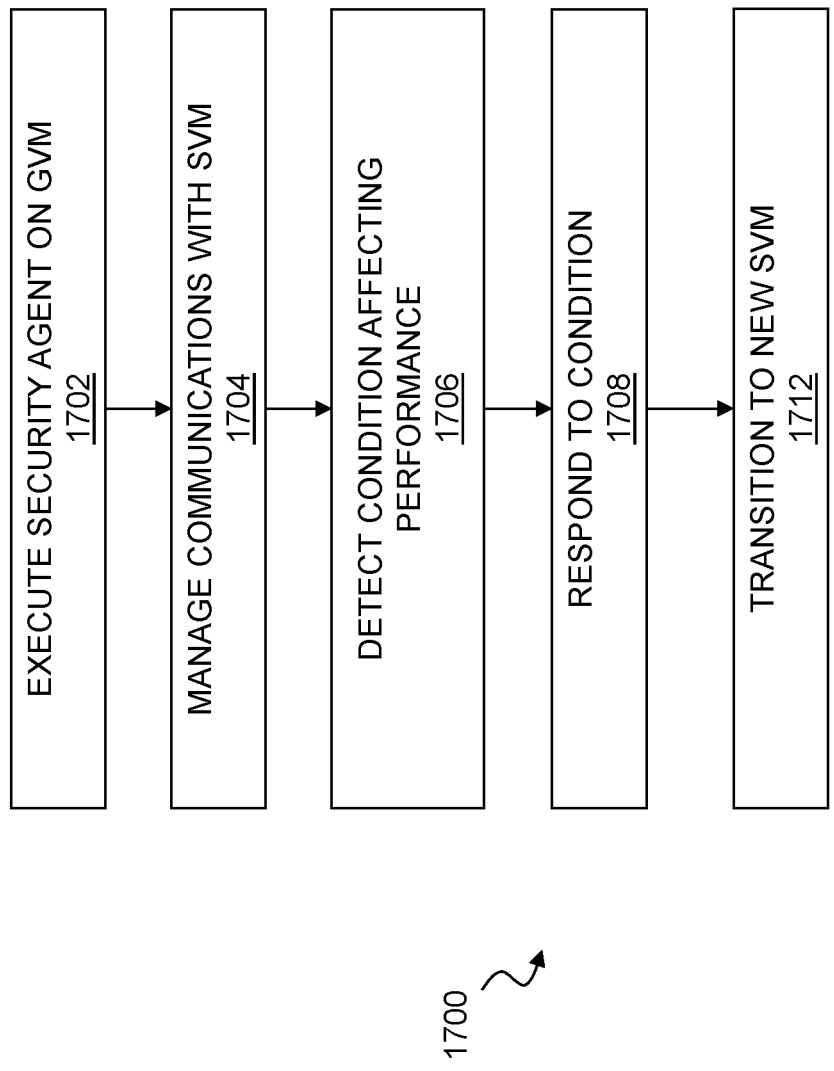
FIG. 17 shows a method for operating a guest virtual machine in a virtualized environment.

FIG. 17 shows a method for operating a guest virtual machine in a virtualized environment.

As shown in step 1702, the method 1700 may include executing a security agent on a guest virtual machine in a virtualized computing environment. This may generally include any of the security agents, guest virtual machines and virtualized computing environments described herein.

Although not depicted in FIG. 17, the method 1700 may also include executing other contextual components such as one or more hypervisors to provide the virtualized computing environment, a management console, a plurality of security virtual machines within the virtualized computing environment, and a management console to manage the security virtual machines and/or guest virtual machines.

As shown in step 1704, the method 1700 may include managing communications between the guest virtual machine and a first security virtual machine (e.g., with the security agent). The first security virtual machine may, through this communication, provide one or more security services to the guest virtual machine. For example, the one or more security services may include file scanning. The one or more security services may also or instead include malware definition updates for use by the security agent in detecting malware on the guest virtual machine, network traffic monitoring and so forth.

As shown in step 1706, the method 1700 may include detecting a condition affecting performance of the first security virtual machine in providing security services to the guest virtual machine. This may, for example include measuring a latency of a connection between the first security virtual machine and the guest virtual machine. The condition may also or instead include other conditions related to performance of the first security virtual machine. For example, the condition may include a network performance dropping below a predetermined threshold for latency, e.g., when the time it takes for the first security virtual machine to respond to a request for security services is too long. A variety of factors may contribute to an increased latency, such as an excessive load on the first security virtual machine, a high load or malfunction of the physical computing device hosting the first security virtual machine, high network traffic on a network coupled to the first security virtual machine, a malfunction or malware on the first security virtual machine, and so forth. Whatever the cause, the increased latency may be used as a trigger to initiate selection of a new security virtual machine for the guest virtual machine.

Other conditions may also or instead be used in a similar manner. For example, the condition may include a network performance dropping below a predetermined threshold for bandwidth. The condition may also or instead include a notification that the first security virtual machine will stop providing security services, e.g., if the first security virtual machine is undergoing planned obsolescence or maintenance. The condition may also or instead include a notification that the guest virtual machine will migrate to a different physical machine, which may trigger a new search for more suitable (e.g., better performing) security virtual machines available on the new physical machine.

In another aspect, the condition may be related to a health of the security virtual machine. In this context, health may be measured using one or more objective criteria such as the status of various security or software patches, the presence of a heartbeat from the security virtual machine indicating that it is not compromised, a result of a scan for malware, or the like. In another aspect, these criteria and/or other criteria may be combined to provide a composite health score, reputation score, or the like that describes a general or overall health status of the security virtual machine. In one aspect health may be used in combination with one or more performance metrics so that a security virtual machine is only used (or only initially selected) when it is both healthy and performing adequately.

Latency may be a useful metric for evaluating whether a current security virtual machine is performing adequately. Thus, in one aspect, a predetermined threshold for initiating a change in security virtual machines may be a predetermined range of, or offset from, a lowest latency from among the security virtual machines operating in the virtualized environment. Thus, for example, if a current security virtual machine is operating with a latency within, e.g., two milliseconds of the lowest latency security virtual machine, then the guest virtual machine may continue using the current security virtual machine. Other latency-based thresholds may also or instead be used. For example, the predetermined threshold may be determined based on the communication latency among a top percentile group of the security virtual machines available in the virtualized computing environment. As another example, the predetermined threshold may be determined based on an average communication latency among a top percentile group of the security virtual machines available in the virtualized computing environment.

The available security virtual machines may be further divided into tiers so that, e.g., the most responsive security virtual machines are within a first tier (e.g., within 2 ms of the fastest machine), the second most responsive group of security virtual machines are within a second tier (e.g., within 2-4 ms of the fastest machine), and the least responsive group of virtual machines (e.g., >4 ms slower than the fastest machine) are within a third tier. With security virtual machines categorized in this manner, the guest virtual machine may continue using the current security virtual machine even if the current security virtual machine falls into the second tier of available security virtual machines based on performance. However, if the current security virtual machine falls into the third tier, then a new security virtual machine may be located and selected as described herein, e.g., by randomly selecting from among the first-tier machines. By controlling selection and transitions in this manner, the method 1700 may locate high-performing security virtual machines for new connections, while balancing load among security virtual machines (e.g., with random selections) and reducing spurious transitions among machines during modest declines in performance.

As shown in step 1708, the method 1700 may include responding to the condition detected in step 1706. Thus, in response to the condition, the method 1700 may include selecting a second security virtual machine from among a number of other security virtual machines within the virtualized computing environment, e.g., based on one or more connectivity criteria. This technique may be employed in a variety of virtualized environment configurations. For example, at least one of the other security virtual machines may be hosted on a first physical computing device separate from, and connected in a communicating relationship through a physical data network to, a second physical computing device hosting the guest virtual machine. In another aspect, the second security virtual machine may be hosted on a second physical computing device separate from, and connected in a communicating relationship through a physical data network to, a first physical computing device hosting the guest virtual machine. In another aspect, the second security virtual machine may be hosted on a second physical computing device separate from, and connected in a communicating relationship through a physical data network to, a first physical computing device hosting the first security virtual machine.

In one aspect, when the latency increases beyond a predetermined threshold, the method 1700 may include randomly selecting a second security virtual machine from among a group of security virtual machines within the virtualized computing environment having a healthy state and a communication latency above a predetermined threshold for all of the security virtual machines available in the virtualized computing environment. Other evaluation and selection techniques based on other network connectivity criteria may also or instead by employed. For example, the one or more connectivity criteria may include a latency of communications with each of the number of other security virtual machines. The one or more connectivity criteria may also or instead include a bandwidth of communications with each of the number of other security virtual machines, or other criteria such as a guest machine load for each of the number of other security virtual machines. It will be understood that these criteria may be used instead of or in addition to a health state of the available security virtual machines.

Other selection criteria and techniques may also or instead be employed. By way of non-limiting example, the method 1700 may include grouping the security virtual machines into at least two percentile groups based on latency, the at least two percentile groups including a lowest latency group. Selecting a new security virtual machine may then include randomly selecting one of the security virtual machines in the lowest latency group.

As shown in step 1712, the method may include transitioning use of the security services by the guest virtual machine from the first security virtual machine to the second security virtual machine selected in step 1708.

According to the foregoing, there is discloses herein a device including a computing device with one or more processors and a memory. The memory may bear computer code configured to execute on the one or more processors to create a virtual computing environment including one or more hypervisors configured to provide the virtual computing environment, a number of guest virtual machines executing in the virtual computing environment, and a number of security virtual machines executing in the virtual computing environment, the computer code further configured to provide security services to one of the guest virtual machines by performing the steps of executing a security agent on one of the guest virtual machines in the virtualized computing environment, managing communications between the one of the guest virtual machines and a first security virtual machine with the security agent, the first security virtual machine providing one or more security services to the one of the guest virtual machines, detecting a condition affecting performance of the first security virtual machine in providing security services to the one of the guest virtual machines, in response to the condition, selecting a second security virtual machine from the number of security virtual machines within the virtualized computing environment based on one or more connectivity criteria, and transitioning use of the security services by the one of the guest virtual machines from the first security virtual machine to the second security virtual machine.

Figure 18:
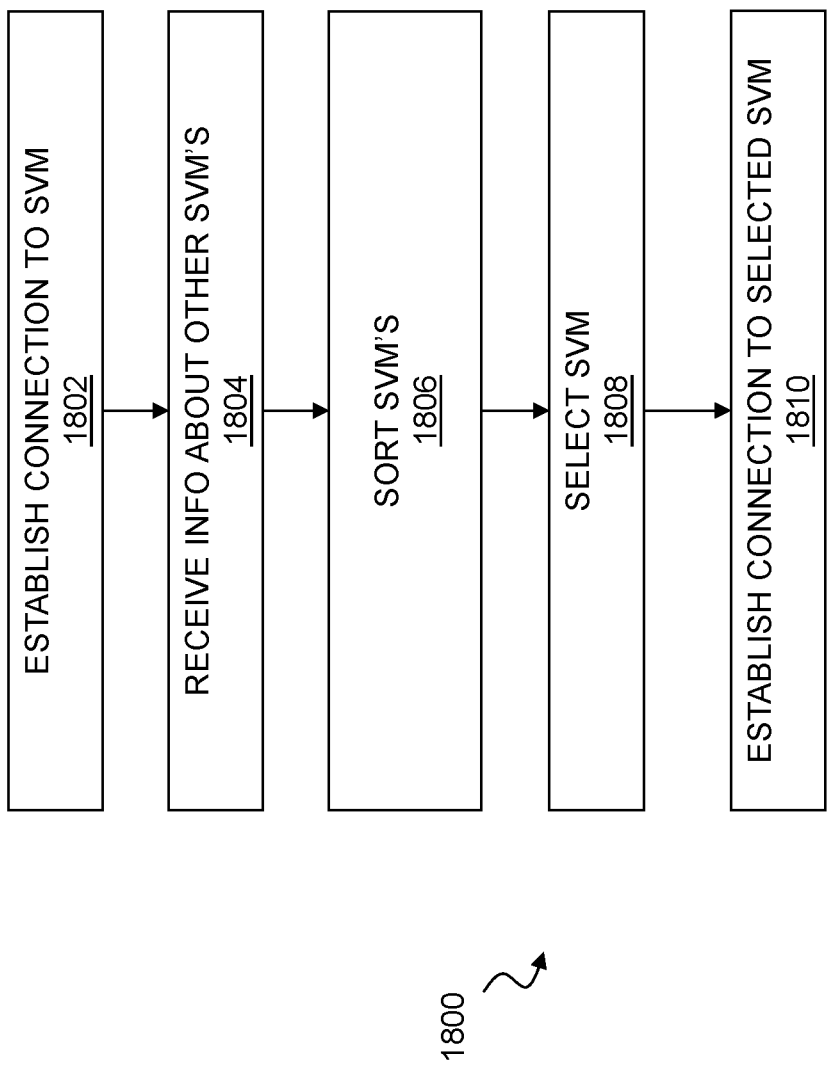
FIG. 18 shows a method for managing security virtual machine resources in a virtualized computing environment.

FIG. 18 shows a method for managing security virtual machine resources in a virtualized computing environment.

As shown in step 1802, the method 1800 may begin with establishing a first connection from a virtual guest machine to a security virtual machine within a virtualization environment to receive security services. The security virtual machine may be one of a number of security virtual machines within the virtualization environment configured to provide services to a number of guest virtual machines, which may include security services such as file scanning by receiving files from the number of guest virtual machines, scanning the files for malicious code, and responding to detections of malicious code. This may also or instead include other security services such as network traffic monitoring, providing software patches and updates, providing malware definition updates, and so forth.

As shown in step 1804, the method 1800 may include receiving information about one or more other security virtual machines within the virtualization environment at the guest virtual machine, the information including one or more performance metrics. The information may, for example, include a list of the available security virtual machines, which may be provided from the security virtual machine, from a management console, from another one of the guest virtual machines, or some combination of these.

In general, receiving information may include actively requesting information, such as by querying available security virtual machines within the virtualization environment from the guest virtual machine to obtain information about one or more other security virtual machines within the virtualization environment at the guest virtual machine, the information including one or more performance metrics, such as by polling the virtualization environment to locate available security virtual machines and then transmitting requests for corresponding information to each security virtual machine that responds. However, other techniques for gathering information within the virtualization environment may also or instead be employed. For example, receiving information about one or more other security virtual machines within the virtualization environment may include receiving periodic notifications from available security virtual machines within the virtualized computing environment.

The method 1800 may also or instead include creating a list of available security virtual machines, e.g., by aggregating broadcast notifications from one or more security virtual machines within the virtualization environment. In another aspect, this may include creating a list of available security virtual machines by polling one or more other guest virtual machines within the virtualization environment. In another aspect, the method 1800 may include providing a list of the one or more other security virtual machines to the security virtual machine from a management console for the virtualized computing environment, which may be a list that is configured when the virtualized environment is created, or that is dynamically maintained by the management console and that changes as security virtual machines are created and expired. In this context, receiving information about one or more other security virtual machines may include requesting the list from the security virtual machine, or from the management console.

Similarly, performance metrics may be obtained using a variety of techniques, which may be included in or independent from the process by which the list of available security virtual machines is obtained. For example, the one or more performance metrics are measured by the guest virtual machine, or the one or more performance metrics may be reported to the guest virtual machine by the available security virtual machines. The method 1800 may also or instead include communicating one or more performance metrics for the available security virtual machines within the virtualization environment to a management console for the virtualization environment. In this manner, the management console may maintain an up-to-date record of current performance statistics that may be distributed on-demand to other guest virtual machines or used in allocating or otherwise managing security virtual machines within the virtualization environment.

As shown in step 1806, the method 1800 may include processing the received information and sorting the one or more other security virtual machines into a number of groups based on performance. The number of groups may, for example, include a performing group based on at least one of the performance metrics contained in the information about the security virtual machines.

As shown in step 1808, the method 1800 may include selecting an alternative security virtual machine from the performance group, such as by randomly selecting one of the security virtual machines in the performance group for use by the one of the guest virtual machines. As discussed above, a performance group may be identified or formed using any of a variety of suitable metrics for evaluating the performance of individual security virtual machines. For example, the performance group of security virtual machines may include a lowest latency one of the security virtual machines and one or more other ones of the security virtual machines having a latency within a predetermined range of the lowest latency one of the security virtual machines. The performance group may more generally include one or more of the available security virtual machines with at least one of the performance metrics within a predetermined range.

The selection of a new security virtual machine may be caused or initiated by a variety of conditions. For example, selecting the alternative security virtual machine includes selecting the alternative security virtual machine in response to a notification that the security virtual machine will terminate services, or in in response to a determination that the guest virtual machine will migrate to a different physical host. As described above, this may also or instead include selecting the alternative security virtual machine in response to a compromised health of the security virtual machine or a degradation of responsiveness of, or connectivity to, the security virtual machine.

Regardless of the cause of the new selection or the manner in which the selection is made, once the alternative security virtual machine is selected a transition to the alternative security virtual machine may be initiated.

As shown in step 1810, the method 1800 may include establishing a second connection to the alternative security virtual machine to receive security services at the virtual guest machine. This may be an exclusive or inclusive connection. That is, the method 1800 may include maintaining the first connection and the second connection for receiving security services so that the guest virtual machine has a continuous backup service available, or the method 1800 may include terminating the first connection so that a single active connection is generally maintained. In one aspect, this may include terminating the first connection after establishing the second connection so that at least one connection is always available. However, this is not necessary, and in some embodiments the first connection may be terminated before the second connection is established.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes, such as random-access memory associated with a processor, or a storage device such as a disk drive, flash memory or any other optical, electromagnetic, magnetic, infrared or other device or combination of devices.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource, e.g., a server or cloud computer or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, methods and systems described above are set forth by way of example and not of limitation. Numerous variations, additions, omissions, and other modifications will be apparent to one of ordinary skill in the art. Absent an explicit indication to the contrary, the disclosed steps may be modified, supplemented, omitted, and/or re-ordered without departing from the scope of this disclosure. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:
executing a security agent on a guest virtual machine in a virtualized computing environment;
managing communications between the guest virtual machine and a first security virtual machine with the security agent, the first security virtual machine providing one or more security services to the guest virtual machine;
measuring a latency of a connection between the first security virtual machine and the guest virtual machine;
when the latency continues to satisfy a predetermined threshold value for latency for more than a predetermined time, randomly selecting a second security virtual machine from among a number of other security virtual machines within the virtualized computing environment having a communication latency above a predetermined threshold for all security virtual machines available in the virtualized computing environment and having a heartbeat indicative of a healthy state; and
transitioning use of the one or more security services by the guest virtual machine from the first security virtual machine to the second security virtual machine.

2. The computer program product of claim 1 wherein the predetermined threshold is a time for the communication latency within a predetermined range of a lowest latency one of the security virtual machines.

3. The computer program product of claim 1 wherein the predetermined threshold is determined based on the communication latency among a top percentile group of the security virtual machines available in the virtualized computing environment.

4. The computer program product of claim 1 wherein the predetermined threshold is determined based on an average communication latency among a top percentile group of the security virtual machines available in the virtualized computing environment.

5. A method comprising:
executing a security agent on a guest virtual machine in a virtualized computing environment;
managing communications between the guest virtual machine and a first security virtual machine, the first security virtual machine providing one or more security services to the guest virtual machine;
detecting a condition affecting performance of the first security virtual machine in providing security services to the guest virtual machine;
in response to the condition indicating a decrease in quality of connectivity to the first security virtual machine by continuing to meet a predetermined threshold for latency for a time exceeding a predetermined duration, selecting a second security virtual machine from among a number of other security virtual machines within the virtualized computing environment having one or more connectivity criteria and having a heartbeat indicative of a healthy state; and
transitioning use of the security services by the guest virtual machine from the first security virtual machine to the second security virtual machine.

6. The method of claim 5 wherein the condition includes a network performance dropping below the predetermined threshold for latency.

7. The method of claim 5 wherein the condition includes a network performance dropping below a predetermined threshold for bandwidth.

8. The method of claim 5 wherein the condition includes a notification that the first security virtual machine will stop providing security services.

9. The method of claim 5 wherein the condition includes a notification that the guest virtual machine will migrate to a different physical machine.

10. The method of claim 5 wherein the one or more security services include file scanning.

11. The method of claim 5 wherein the one or more security services include at least one of malware definition updates for use by the security agent in detecting malware on the guest virtual machine and network monitoring.

12. The method of claim 5 wherein the one or more connectivity criteria include a latency of communications with each of the number of other security virtual machines.

13. The method of claim 5 wherein the one or more connectivity criteria include a bandwidth of communications with each of the number of other security virtual machines.

14. The method of claim 5 wherein the one or more connectivity criteria include a guest machine load for each of the number of other security virtual machines.

15. The method of claim 5 wherein at least one of the other security virtual machines is hosted on a first physical computing device separate from, and connected in a communicating relationship through a physical data network to, a second physical computing device hosting the guest virtual machine.

16. The method of claim 5 wherein the second security virtual machine is hosted on a second physical computing device separate from, and connected in a communicating relationship through a physical data network to, a first physical computing device hosting the guest virtual machine.

17. The method of claim 5 wherein the second security virtual machine is hosted on a second physical computing device separate from, and connected in a communicating relationship through a physical data network to, a first physical computing device hosting the first security virtual machine.

18. The method of claim 5 wherein selecting the second security virtual machine includes randomly selecting a security virtual machine in a lowest latency group.

19. A device comprising:
a computing device including one or more processors; and
a memory bearing computer code configured to execute on the one or more processors to create a virtual computing environment including one or more hypervisors configured to provide the virtual computing environment, a number of guest virtual machines executing in the virtual computing environment, and a group of security virtual machines executing in the virtual computing environment, the computer code further configured to provide security services to one of the number of guest virtual machines by performing the steps of executing a security agent on one of the number of guest virtual machines in the virtualized computing environment, managing communications between the one of the number of guest virtual machines and a first security virtual machine with the security agent, the first security virtual machine providing one or more security services to the one of the number of guest virtual machines, detecting a condition affecting performance of the first security virtual machine in providing security services to the one of the number of guest virtual machines, in response to the condition indicating a decrease in quality of connectivity to the first security virtual machine by continuing to meet a predetermined threshold for latency for a time exceeding a predetermined duration, selecting a second security virtual machine from among a number of other security virtual machines within the virtualized computing environment having one or more connectivity criteria and having a heartbeat indicative of a healthy state, and transitioning use of the security services by the one of the number of guest virtual machines from the first security virtual machine to the second security virtual machine.

* * * * *